(12) United States Patent
Ghozati et al.

(10) Patent No.: US 9,516,104 B2
(45) Date of Patent: Dec. 6, 2016

(54) INTELLIGENT LOAD BALANCER ENHANCED ROUTING

(71) Applicant: TeleCommunication Systems, Inc., Annapolis, MD (US)

(72) Inventors: Kambiz Ghozati, Ellicott City, MD (US); Paul Thompson, Bothell, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 164 days.

(21) Appl. No.: 14/482,996

(22) Filed: Sep. 10, 2014

(65) Prior Publication Data

US 2015/0071172 A1    Mar. 12, 2015

Related U.S. Application Data

(60) Provisional application No. 61/888,700, filed on Oct. 9, 2013, provisional application No. 61/876,355, filed on Sep. 11, 2013.

(51) Int. Cl.
| | |
|---|---|
| *H04W 4/00* | (2009.01) |
| *H04L 29/08* | (2006.01) |
| *H04W 4/02* | (2009.01) |

(52) U.S. Cl.
CPC ....... *H04L 67/1014* (2013.01); *H04L 67/1021* (2013.01); *H04L 67/141* (2013.01); *H04W 4/02* (2013.01)

(58) Field of Classification Search
None
See application file for complete search history.

(56) References Cited

U.S. PATENT DOCUMENTS

| | | |
|---|---|---|
| 1,103,073 A | 7/1914 | O'Connell |
| 4,445,118 A | 4/1984 | Taylor et al. |
| (Continued) | | |

FOREIGN PATENT DOCUMENTS

| | | |
|---|---|---|
| SE | WO99/21380 | 4/1999 |
| WO | WO01/45342 | 6/2001 |
| (Continued) | | |

OTHER PUBLICATIONS

Le-Pond Chin, Jyh-Hong Wen, Ting-Way Liu, The Study of the Interconnection of GSM Mobile Communications Systems Over IP Based Network, May 6, 2001, IEEE, Vehicular Technology Conference, vol. 3, pp. 2219-2223.

(Continued)

*Primary Examiner* — Otis L Thompson, Jr.
(74) *Attorney, Agent, or Firm* — Tarolli, Sundheim, Covell & Tummino LLP

(57) ABSTRACT

Enhanced intelligent routing logic for routing and load balancing a SET-initiated SUPL session request based on SET capabilities (e.g. SET-supported positioning protocols) and a roaming status identified for a requesting SET. When a SET capabilities parameter in a SUPL START message initiated by a requesting SET indicates that the SET supports a LTE positioning protocol (LPP), only, enhanced intelligent routing logic routes the SUPL session request to newly configured SUPL servers that support the LTE positioning protocol (LPP), only. Alternatively, when SET capabilities indicate that a requesting SET supports a radio resource location services protocol (RRLP), in addition to or in exclusion of a LPP, the intelligent router routes the session request message to SUPL servers that support the RRLP, in addition to or in exclusion of the LPP. Intelligent routing logic may also be enhanced to support SUPL intelligent off load (SI-OL) based on SET capabilities.

19 Claims, 8 Drawing Sheets

(56) References Cited

U.S. PATENT DOCUMENTS

| | | |
|---|---|---|
| 4,494,119 A | 1/1985 | Wimbush |
| 4,651,156 A | 3/1987 | Martinez |
| 4,706,275 A | 11/1987 | Kamil |
| 4,737,916 A | 4/1988 | Ogawa |
| 4,891,638 A | 1/1990 | Davis |
| 4,891,650 A | 1/1990 | Sheffer |
| 4,939,662 A | 7/1990 | Numura |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,166,972 A | 11/1992 | Smith |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Carroll |
| 5,283,570 A | 2/1994 | DeLuca |
| 5,289,527 A | 2/1994 | Tiedemann |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicki |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimulah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,389,934 A | 2/1995 | Kass |
| 5,390,339 A | 2/1995 | Bruckery |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,434,789 A | 7/1995 | Fraker |
| 5,454,024 A | 9/1995 | Lebowitz |
| 5,461,390 A | 10/1995 | Hosher |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,504,491 A | 4/1996 | Chapman |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | McPheters |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,557,254 A | 9/1996 | Johnson |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Angstrom |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,122 A | 6/1997 | Shah |
| 5,636,276 A | 6/1997 | Brugger |
| 5,661,652 A | 8/1997 | Sprague |
| 5,661,755 A | 8/1997 | Van de Kerkhof |
| 5,682,600 A | 10/1997 | Salin |
| 5,684,951 A | 11/1997 | Goldman |
| 5,689,245 A | 11/1997 | Noreen |
| 5,689,269 A | 11/1997 | Norris |
| 5,689,809 A | 11/1997 | Grube |
| 5,699,053 A | 12/1997 | Jonsson |
| 5,717,688 A | 2/1998 | Belanger |
| 5,727,057 A | 3/1998 | Emery |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,774,824 A | 6/1998 | Streit |
| 5,787,357 A | 7/1998 | Salin |
| 5,794,142 A | 8/1998 | Vantilla |
| 5,797,094 A | 8/1998 | Houde |
| 5,797,096 A | 8/1998 | Lupien |
| 5,801,700 A | 9/1998 | Ferguson |
| 5,802,492 A | 9/1998 | DeLorrme |
| 5,806,000 A | 9/1998 | Vo |
| 5,809,415 A | 9/1998 | Rossmann |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khuc |
| 5,841,396 A | 11/1998 | Krasner |
| 5,857,201 A | 1/1999 | Wright, Jr. |
| 5,864,667 A | 1/1999 | Barkam |
| 5,874,914 A | 2/1999 | Krasner |
| 5,896,369 A | 4/1999 | Warsta |
| 5,920,821 A | 7/1999 | Seaholtz |
| 5,922,074 A | 7/1999 | Richard |
| 5,926,118 A | 7/1999 | Hayashida |
| 5,930,250 A | 7/1999 | Klok |
| 5,944,768 A | 8/1999 | Ito |
| 5,953,398 A | 9/1999 | Hill |
| 5,960,362 A | 9/1999 | Grob |

(56) References Cited

U.S. PATENT DOCUMENTS

| | | |
|---|---|---|
| 5,974,054 A | 10/1999 | Couts |
| 5,978,685 A | 11/1999 | Laiho |
| 5,982,301 A | 11/1999 | Ohta |
| 5,983,099 A | 11/1999 | Yao |
| 5,983,109 A | 11/1999 | Montoya |
| 5,987,323 A | 11/1999 | Houtari |
| 5,998,111 A | 12/1999 | Abe |
| 5,999,124 A | 12/1999 | Sheynblat |
| 6,002,936 A | 12/1999 | Roel-Ng |
| 6,014,602 A | 1/2000 | Kithol |
| 6,032,051 A | 2/2000 | Hall |
| 6,035,025 A | 3/2000 | Hanson |
| 6,035,253 A | 3/2000 | Hayahi |
| 6,049,710 A | 4/2000 | Nilsson |
| 6,052,081 A | 4/2000 | Krasner |
| 6,058,300 A | 5/2000 | Hanson |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,067,045 A | 5/2000 | Castelloe |
| 6,070,067 A | 5/2000 | Nguyen |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski, Jr. |
| 6,091,957 A | 7/2000 | Larkins |
| 6,101,378 A | 8/2000 | Barabush |
| 6,108,533 A | 8/2000 | Brohoff |
| 6,115,611 A | 9/2000 | Kimoto |
| 6,122,503 A | 9/2000 | Daly |
| 6,122,520 A | 9/2000 | Want |
| 6,124,810 A | 9/2000 | Segal |
| 6,128,664 A | 10/2000 | Yanagidate et al. |
| 6,131,067 A | 10/2000 | Girerd |
| 6,133,874 A | 10/2000 | Krasner |
| 6,134,316 A | 10/2000 | Kallioniemi |
| 6,134,483 A | 10/2000 | Vayanos |
| 6,138,003 A | 10/2000 | Kingdon |
| 6,148,197 A | 11/2000 | Bridges |
| 6,148,198 A | 11/2000 | Anderson |
| 6,149,353 A | 11/2000 | Nilsson |
| 6,150,980 A | 11/2000 | Krasner |
| 6,154,172 A | 11/2000 | Piccionelli |
| 6,169,516 B1 | 1/2001 | Watanabe |
| 6,169,891 B1 | 1/2001 | Gorham |
| 6,169,901 B1 | 1/2001 | Boucher |
| 6,169,902 B1 | 1/2001 | Kawamoto |
| 6,173,181 B1 | 1/2001 | Losh |
| 6,178,505 B1 | 1/2001 | Schneider |
| 6,178,506 B1 | 1/2001 | Quick, Jr. |
| 6,181,935 B1 | 1/2001 | Gossman |
| 6,181,939 B1 | 1/2001 | Ahvenainen |
| 6,182,006 B1 | 1/2001 | Meek |
| 6,182,227 B1 | 1/2001 | Blair |
| 6,185,426 B1 | 2/2001 | Alperovich |
| 6,188,354 B1 | 2/2001 | Soliman |
| 6,188,752 B1 | 2/2001 | Lesley |
| 6,188,909 B1 | 2/2001 | Alanara |
| 6,188,957 B1 | 2/2001 | Bechtolsheim |
| 6,189,098 B1 | 2/2001 | Kaliski, Jr. |
| 6,195,557 B1 | 2/2001 | Havinis |
| 6,198,431 B1 | 3/2001 | Gibson |
| 6,199,045 B1 | 3/2001 | Giniger |
| 6,199,113 B1 | 3/2001 | Alegre |
| 6,204,844 B1 | 3/2001 | Fumarolo |
| 6,205,330 B1 | 3/2001 | Winbladh |
| 6,208,290 B1 | 3/2001 | Krasner |
| 6,208,854 B1 | 3/2001 | Roberts |
| 6,215,441 B1 | 4/2001 | Moeglein |
| 6,219,557 B1 | 4/2001 | Havinis |
| 6,223,046 B1 | 4/2001 | Hamill-Keays |
| 6,226,529 B1 | 5/2001 | Bruno |
| 6,239,742 B1 | 5/2001 | Krasner |
| 6,247,135 B1 | 6/2001 | Feague |
| 6,249,680 B1 | 6/2001 | Wax |
| 6,249,742 B1 | 6/2001 | Frriederich |
| 6,249,744 B1 | 6/2001 | Morita |
| 6,249,873 B1 | 6/2001 | Richard |
| 6,253,074 B1 | 6/2001 | Carlsson |
| 6,253,203 B1 | 6/2001 | O'Flaherty |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,278,701 B1 | 8/2001 | Ayyagari |
| 6,278,936 B1 | 8/2001 | Jones |
| 6,289,373 B1 | 9/2001 | Dezonno |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,317,594 B1 | 11/2001 | Gossman |
| 6,317,684 B1 | 11/2001 | Roeseler |
| 6,321,091 B1 | 11/2001 | Holland |
| 6,321,092 B1 | 11/2001 | Fitch |
| 6,321,158 B1 | 11/2001 | DeLorme |
| 6,321,257 B1 | 11/2001 | Kotala |
| 6,324,524 B1 | 11/2001 | Lent |
| 6,327,473 B1 | 12/2001 | Soliman |
| 6,327,479 B1 | 12/2001 | Mikkola |
| 6,331,825 B1 | 12/2001 | Ladner |
| 6,333,919 B2 | 12/2001 | Gaffney |
| 6,360,093 B1 | 3/2002 | Ross |
| 6,360,102 B1 | 3/2002 | Havinis |
| 6,363,254 B1 | 3/2002 | Jones |
| 6,366,782 B1 | 4/2002 | Fumarolo |
| 6,366,856 B1 | 4/2002 | Johnson |
| 6,367,019 B1 | 4/2002 | Ansell |
| 6,370,389 B1 | 4/2002 | Isomursu |
| 6,377,209 B1 | 4/2002 | Krasner |
| 6,397,143 B1 | 5/2002 | Paschke |
| 6,400,314 B1 | 6/2002 | Krasner |
| 6,400,943 B1 | 6/2002 | Montoya |
| 6,400,958 B1 | 6/2002 | Isomursu |
| 6,411,254 B1 | 6/2002 | Moeglein |
| 6,415,224 B1 | 7/2002 | Wako |
| 6,421,002 B2 | 7/2002 | Krasner |
| 6,427,001 B1 | 7/2002 | Contractor |
| 6,429,808 B1 | 8/2002 | King |
| 6,433,734 B1 | 8/2002 | Krasner |
| 6,434,381 B1 | 8/2002 | Moore |
| 6,437,735 B1 | 8/2002 | McMahan |
| 6,441,752 B1 | 8/2002 | Fomukong |
| 6,442,384 B1 | 8/2002 | Shah |
| 6,442,391 B1 | 8/2002 | Johansson |
| 6,449,473 B1 | 9/2002 | Raivisto |
| 6,449,476 B1 | 9/2002 | Hutchison, IV |
| 6,456,852 B2 | 9/2002 | Bar |
| 6,463,272 B1 | 10/2002 | Wallace |
| 6,466,788 B1 | 10/2002 | Carlsson |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,526,026 B1 | 2/2003 | Menon |
| 6,529,500 B1 | 3/2003 | Pandharipande |
| 6,529,722 B1 | 3/2003 | Heinrich |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,232 B2 | 3/2003 | Hendrey et al. |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,522 B1 | 4/2003 | Flynn |
| 6,549,776 B1 | 4/2003 | Joong |

(56) References Cited

U.S. PATENT DOCUMENTS

| | | |
|---|---|---|
| 6,549,844 B1 | 4/2003 | Egberts |
| 6,556,832 B1 | 4/2003 | Soliman |
| 6,560,461 B1 | 5/2003 | fomukong |
| 6,560,534 B2 | 5/2003 | Abraham |
| 6,563,824 B1 | 5/2003 | Bhatia |
| 6,564,261 B1 | 5/2003 | Gudjonsson |
| 6,570,530 B2 | 5/2003 | Gaal |
| 6,571,095 B1 | 5/2003 | Koodli |
| 6,571,174 B2 | 5/2003 | Rigazio |
| 6,574,558 B2 | 6/2003 | Kohli |
| 6,580,390 B1 | 6/2003 | Hay |
| 6,584,552 B1 | 6/2003 | Kuno |
| 6,587,691 B1 | 7/2003 | Granstam |
| 6,594,500 B2 | 7/2003 | Bender |
| 6,597,311 B2 | 7/2003 | Sheynblat |
| 6,600,927 B2 | 7/2003 | Hamilton |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,670 B1 | 9/2003 | Chansarkar |
| 6,621,423 B1 | 9/2003 | Cooper |
| 6,621,452 B2 | 9/2003 | Knockeart |
| 6,621,810 B1 | 9/2003 | Leung |
| 6,628,233 B2 | 9/2003 | Knockeart |
| 6,633,255 B2 | 10/2003 | Krasner |
| 6,640,184 B1 | 10/2003 | Rabe |
| 6,640,185 B2 | 10/2003 | Tokota |
| 6,643,516 B1 | 11/2003 | Stewart |
| 6,650,288 B1 | 11/2003 | Pitt |
| 6,661,353 B1 | 12/2003 | Gopen |
| 6,661,372 B1 | 12/2003 | Girerd |
| 6,665,539 B2 | 12/2003 | Sih |
| 6,665,541 B1 | 12/2003 | Krasner |
| 6,665,613 B2 | 12/2003 | Duvall |
| 6,665,715 B1 | 12/2003 | Houri |
| 6,671,620 B1 | 12/2003 | Garin |
| 6,677,894 B2 | 1/2004 | Sheynblat |
| 6,680,694 B1 | 1/2004 | Knockheart |
| 6,687,504 B1 | 2/2004 | Raith |
| 6,691,019 B2 | 2/2004 | Seeley |
| 6,694,258 B2 | 2/2004 | Johnson |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | Van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,578 B2 | 4/2004 | Minear |
| 6,721,652 B1 | 4/2004 | Sanqunetti |
| 6,721,716 B1 | 4/2004 | Gross |
| 6,721,871 B2 | 4/2004 | Piispanen |
| 6,724,342 B2 | 4/2004 | Bloebaum |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,744,856 B2 | 6/2004 | Karnik |
| 6,744,858 B1 | 6/2004 | Ryan |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,266 B1 | 6/2004 | Hundscheidt |
| 6,757,544 B2 | 6/2004 | Rangarajan |
| 6,757,545 B2 | 6/2004 | Nowak |
| 6,766,174 B1 | 7/2004 | Kenyon |
| 6,771,639 B1 | 8/2004 | Holden |
| 6,771,742 B2 | 8/2004 | McCalmont |
| 6,772,340 B1 | 8/2004 | Peinado |
| 6,775,267 B1 | 8/2004 | Kung |
| 6,775,534 B2 | 8/2004 | Lindgren |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,444 B1 | 9/2004 | Vo |
| 6,795,699 B1 | 9/2004 | McCraw |
| 6,799,049 B1 | 9/2004 | Zellner |
| 6,799,050 B1 | 9/2004 | Krasner |
| 6,801,159 B2 | 10/2004 | Swope |
| 6,801,850 B1 | 10/2004 | Wolfson |
| 6,804,524 B1 | 10/2004 | Vandermaijden |
| 6,807,534 B1 | 10/2004 | Erickson |
| 6,810,323 B1 | 10/2004 | Bullock |
| 6,810,405 B1 | 10/2004 | LaRue |
| 6,813,264 B2 | 11/2004 | Vassilovski |
| 6,813,501 B2 | 11/2004 | Kinnunen |
| 6,813,560 B2 | 11/2004 | Van Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong |
| 6,816,782 B1 | 11/2004 | Walters |
| 6,819,919 B1 | 11/2004 | Tanaka |
| 6,820,069 B1 | 11/2004 | Kogan |
| 6,829,475 B1 | 12/2004 | Lee |
| 6,829,532 B2 | 12/2004 | Obradovich |
| 6,832,373 B2 | 12/2004 | O'Neill |
| 6,839,020 B2 | 1/2005 | Geier |
| 6,839,021 B2 | 1/2005 | Sheynblat |
| 6,839,417 B2 | 1/2005 | Weisman |
| 6,839,630 B2 | 1/2005 | Sakamoto |
| 6,842,696 B2 | 1/2005 | Silvester |
| 6,842,715 B1 | 1/2005 | Gaal |
| 6,845,321 B1 | 1/2005 | Kerns |
| 6,847,822 B1 | 1/2005 | Dennison |
| 6,853,916 B2 | 2/2005 | Fuchs |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,733 B2 | 3/2005 | Sandhu |
| 6,867,734 B2 | 3/2005 | Voor |
| 6,873,854 B2 | 3/2005 | Crockett |
| 6,882,850 B2 | 4/2005 | McConnell et al. |
| 6,885,874 B2 | 4/2005 | Grube |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,895,329 B1 | 5/2005 | Wolfson |
| 6,898,516 B2 | 5/2005 | Pechatnikov |
| 6,898,633 B1 | 5/2005 | Lyndersay |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,910,818 B2 | 6/2005 | McLoone |
| 6,912,230 B1 | 6/2005 | Salkini |
| 6,912,395 B2 | 6/2005 | Benes |
| 6,912,545 B1 | 6/2005 | Lundy |
| 6,915,208 B2 | 7/2005 | Garin |
| 6,917,331 B2 | 7/2005 | Gronemeyer |
| 6,925,603 B1 | 8/2005 | Naito |
| 6,930,634 B2 | 8/2005 | Peng |
| 6,934,705 B2 | 8/2005 | Tu |
| 6,937,187 B2 | 8/2005 | Van Diggelen |
| 6,937,872 B2 | 8/2005 | Krasner |
| 6,940,950 B2 | 9/2005 | Dickinson et al. |
| 6,941,144 B2 | 9/2005 | Stein |

(56) References Cited

U.S. PATENT DOCUMENTS

| | | |
|---|---|---|
| 6,944,535 B2 | 9/2005 | Iwata |
| 6,944,540 B2 | 9/2005 | King |
| 6,947,772 B2 | 9/2005 | Minear |
| 6,950,058 B1 | 9/2005 | Davis |
| 6,957,068 B2 | 10/2005 | Hutchison |
| 6,957,073 B2 | 10/2005 | Bye |
| 6,961,562 B2 | 11/2005 | Ross |
| 6,963,557 B2 | 11/2005 | Knox |
| 6,963,748 B2 | 11/2005 | Chithambaram |
| 6,965,754 B2 | 11/2005 | King |
| 6,965,767 B2 | 11/2005 | Maggenti |
| 6,968,044 B2 | 11/2005 | Beason |
| 6,970,871 B1 | 11/2005 | Rayburn |
| 6,970,917 B1 | 11/2005 | Kushwaha |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohler |
| 6,985,747 B2 | 1/2006 | Chithambaram |
| 6,990,081 B2 | 1/2006 | Schaefer |
| 6,993,355 B1 | 1/2006 | Pershan |
| 6,996,720 B1 | 2/2006 | DeMello |
| 6,999,782 B2 | 2/2006 | Shaughnessy |
| 7,024,321 B1 | 4/2006 | Deninger |
| 7,024,393 B1 | 4/2006 | Peinado |
| 7,047,411 B1 | 5/2006 | DeMello |
| 7,058,506 B2 | 6/2006 | Kawase |
| 7,065,351 B2 | 6/2006 | Carter |
| 7,065,507 B2 | 6/2006 | Mohammed |
| 7,072,667 B2 | 7/2006 | Olrik |
| 7,079,857 B2 | 7/2006 | Maggenti |
| 7,089,110 B2 | 8/2006 | Pechatnikov |
| 7,092,385 B2 | 8/2006 | Gallant |
| 7,103,018 B1 | 9/2006 | Hansen |
| 7,103,574 B1 | 9/2006 | Peinado |
| 7,106,717 B2 | 9/2006 | Rousseau |
| 7,110,773 B1 | 9/2006 | Wallace |
| 7,136,466 B1 | 11/2006 | Gao |
| 7,136,838 B1 | 11/2006 | Peinado |
| 7,142,163 B2 | 11/2006 | Fukano |
| 7,142,196 B1 | 11/2006 | Connor |
| 7,142,205 B2 | 11/2006 | Chithambaram |
| 7,145,900 B2 | 12/2006 | Nix |
| 7,151,946 B2 | 12/2006 | Maggenti |
| 7,167,187 B2 | 1/2007 | Scott |
| 7,171,220 B2 | 1/2007 | Belcea |
| 7,171,304 B2 | 1/2007 | Wako |
| 7,177,397 B2 | 2/2007 | Mccalmont |
| 7,177,398 B2 | 2/2007 | Meer |
| 7,177,399 B2 | 2/2007 | Dawson |
| 7,184,418 B1 | 2/2007 | Baba |
| 7,200,380 B2 | 4/2007 | Havlark |
| 7,202,801 B2 | 4/2007 | Chou |
| 7,209,758 B1 | 4/2007 | Moll |
| 7,209,969 B2 | 4/2007 | Lahti |
| 7,218,940 B2 | 5/2007 | Niemenna |
| 7,221,959 B2 | 5/2007 | Lindquist |
| 7,245,900 B1 | 7/2007 | Lamb |
| 7,245,910 B2 | 7/2007 | Osmo |
| 7,260,186 B2 | 8/2007 | Zhu |
| 7,260,384 B2 | 8/2007 | Bales |
| 7,266,376 B2 | 9/2007 | Nakagawa |
| 7,286,929 B2 | 10/2007 | Staton |
| 7,330,899 B2 | 2/2008 | Wong |
| 7,333,480 B1 | 2/2008 | Clarke |
| 7,340,241 B2 | 3/2008 | Rhodes |
| 7,369,508 B2 | 5/2008 | Parantainen |
| 7,369,530 B2 | 5/2008 | Keagy |
| 7,424,293 B2 | 9/2008 | Zhu |
| 7,426,380 B2 | 9/2008 | Hines |
| 7,428,571 B2 | 9/2008 | Ichimura |
| 7,436,785 B1 | 10/2008 | McMullen |
| 7,440,442 B2 | 10/2008 | Grabelsky |
| 7,450,951 B2 | 11/2008 | Vimpari |
| 7,453,990 B2 | 11/2008 | Welenson |
| 7,477,903 B2 | 1/2009 | Wilcock |
| 7,495,608 B1 | 2/2009 | Chen |
| 7,522,581 B2 | 4/2009 | Acharya |
| 7,565,157 B1 | 7/2009 | Ortega |
| 7,602,886 B1 | 10/2009 | Beech |
| 7,623,447 B1 | 11/2009 | Faccin |
| 7,627,331 B2 | 12/2009 | Winterbottom |
| 7,653,544 B2 | 1/2010 | Bradley |
| 7,660,321 B2 | 2/2010 | Cortes |
| 7,702,081 B1 | 4/2010 | Klesper |
| 7,711,094 B1 | 5/2010 | Olshansky |
| 7,739,033 B2 | 6/2010 | Murata |
| 7,747,258 B2 | 6/2010 | Farmer |
| 7,751,614 B2 | 7/2010 | Funakura |
| 7,764,961 B2 | 7/2010 | Zhu |
| 7,774,003 B1 | 8/2010 | Ortega |
| 7,783,297 B2 | 8/2010 | Ishii |
| 7,792,989 B2 | 9/2010 | Toebes |
| 7,822,823 B2 | 10/2010 | Jhanji |
| 7,881,233 B2 | 2/2011 | Bieselin |
| 7,881,730 B2 | 2/2011 | Sheha |
| 7,895,263 B1 | 2/2011 | Kirchmeier |
| 7,937,067 B2 | 5/2011 | Maier |
| 8,249,589 B2 | 8/2012 | Zhu |
| 2001/0011247 A1 | 8/2001 | O'Flaherty |
| 2001/0015756 A1 | 8/2001 | Wilcock |
| 2001/0016849 A1 | 8/2001 | Squibbs |
| 2002/0032036 A1 | 3/2002 | Nakajima |
| 2002/0037735 A1 | 3/2002 | Maggenti |
| 2002/0052214 A1 | 5/2002 | Maggenti |
| 2002/0058515 A1 | 5/2002 | Holler |
| 2002/0061760 A1 | 5/2002 | Maggenti |
| 2002/0069239 A1 | 6/2002 | Katada |
| 2002/0069529 A1 | 6/2002 | Wieres |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0085538 A1 | 7/2002 | Leung |
| 2002/0086683 A1 | 7/2002 | Kohar |
| 2002/0102996 A1 | 8/2002 | Jenkins |
| 2002/0102999 A1 | 8/2002 | Maggenti |
| 2002/0111172 A1 | 8/2002 | DeWolf |
| 2002/0112047 A1 | 8/2002 | Kushwaha |
| 2002/0118650 A1 | 8/2002 | Jagadeesan |
| 2002/0123327 A1 | 9/2002 | Vataja |
| 2002/0123354 A1 | 9/2002 | Nowak |
| 2002/0126656 A1 | 9/2002 | Park |
| 2002/0130906 A1 | 9/2002 | Miyaki |
| 2002/0158777 A1 | 10/2002 | Flick |
| 2002/0164998 A1 | 11/2002 | Younis |
| 2002/0169539 A1 | 11/2002 | Menard |
| 2002/0173317 A1 | 11/2002 | Nykanen |
| 2002/0191595 A1 | 12/2002 | Mar |
| 2003/0009277 A1 | 1/2003 | Fan |
| 2003/0009602 A1 | 1/2003 | Jacobs |
| 2003/0012148 A1 | 1/2003 | Peters |
| 2003/0013449 A1 | 1/2003 | Hose |
| 2003/0014487 A1 | 1/2003 | Iwakawa |
| 2003/0016804 A1 | 1/2003 | Sheha |
| 2003/0026245 A1 | 2/2003 | Ejzak |
| 2003/0032448 A1 | 2/2003 | Bulthius |
| 2003/0036848 A1 | 2/2003 | Sheha |
| 2003/0036949 A1 | 2/2003 | Kaddeche |
| 2003/0037163 A1 | 2/2003 | Kitada |
| 2003/0040272 A1 | 2/2003 | Lelievre |
| 2003/0045327 A1 | 3/2003 | Kobayashi |
| 2003/0054835 A1 | 3/2003 | Gutowski |
| 2003/0060938 A1 | 3/2003 | Duvall |
| 2003/0065788 A1 | 4/2003 | Salomaki |
| 2003/0072318 A1 | 4/2003 | Lam |
| 2003/0078054 A1 | 4/2003 | Okuda |
| 2003/0078064 A1 | 4/2003 | Chan |
| 2003/0081557 A1 | 5/2003 | Mettala |
| 2003/0096623 A1 | 5/2003 | Kim |
| 2003/0101329 A1 | 5/2003 | Lahti |
| 2003/0101341 A1 | 5/2003 | Kettler |
| 2003/0103484 A1 | 6/2003 | Oommen |
| 2003/0108176 A1 | 6/2003 | Kung |

(56) References Cited

U.S. PATENT DOCUMENTS

| | | |
|---|---|---|
| 2003/0109245 A1 | 6/2003 | McCalmont |
| 2003/0114157 A1 | 6/2003 | Spitz |
| 2003/0119521 A1 | 6/2003 | Tipnis |
| 2003/0119528 A1 | 6/2003 | Pew |
| 2003/0125064 A1 | 7/2003 | Koskinen |
| 2003/0126250 A1 | 7/2003 | Jhanji |
| 2003/0137961 A1 | 7/2003 | Tsirtsis |
| 2003/0149526 A1 | 8/2003 | Zhou |
| 2003/0151501 A1 | 8/2003 | Teckchandani |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0165254 A1 | 9/2003 | Chen |
| 2003/0182053 A1 | 9/2003 | Swope |
| 2003/0186709 A1 | 10/2003 | Rhodes |
| 2003/0196105 A1 | 10/2003 | Fineburg |
| 2003/0201931 A1 | 10/2003 | Durst |
| 2003/0204640 A1 | 10/2003 | Sahineja |
| 2003/0223381 A1 | 12/2003 | Schroderus |
| 2003/0231190 A1 | 12/2003 | Jawerth |
| 2003/0236618 A1 | 12/2003 | Kamikawa |
| 2004/0002326 A1 | 1/2004 | Maher |
| 2004/0002814 A1 | 1/2004 | Gogic |
| 2004/0008225 A1 | 1/2004 | Campbell |
| 2004/0021567 A1 | 2/2004 | Dunn |
| 2004/0032485 A1 | 2/2004 | Stephens |
| 2004/0041729 A1 | 3/2004 | Rowitch |
| 2004/0043775 A1 | 3/2004 | Kennedy |
| 2004/0044623 A1 | 3/2004 | Wake |
| 2004/0047342 A1 | 3/2004 | Gavish |
| 2004/0047461 A1 | 3/2004 | Weisman et al. |
| 2004/0054428 A1 | 3/2004 | Sheha |
| 2004/0068724 A1 | 4/2004 | Gardner |
| 2004/0076277 A1 | 4/2004 | Kuusinen |
| 2004/0098497 A1 | 5/2004 | Banet |
| 2004/0124977 A1 | 7/2004 | Biffar |
| 2004/0132465 A1 | 7/2004 | Mattila |
| 2004/0146040 A1 | 7/2004 | Phan-Anh |
| 2004/0181689 A1 | 9/2004 | Kiyoto |
| 2004/0184584 A1 | 9/2004 | McCalmont |
| 2004/0186880 A1 | 9/2004 | Yamamoto |
| 2004/0190497 A1 | 9/2004 | Knox |
| 2004/0198332 A1 | 10/2004 | Lundsgaard |
| 2004/0198375 A1 | 10/2004 | Schwengler |
| 2004/0198386 A1 | 10/2004 | Dupray |
| 2004/0203732 A1 | 10/2004 | Brusilovsky |
| 2004/0204829 A1 | 10/2004 | Endo |
| 2004/0204847 A1 | 10/2004 | Yanai |
| 2004/0205151 A1 | 10/2004 | Sprigg |
| 2004/0205517 A1 | 10/2004 | Lampert |
| 2004/0220957 A1 | 11/2004 | McDonough |
| 2004/0229632 A1 | 11/2004 | Flynn |
| 2004/0242238 A1 | 12/2004 | Wang |
| 2004/0267445 A1 | 12/2004 | De Luca |
| 2005/0020242 A1 | 1/2005 | Holland |
| 2005/0021769 A1 | 1/2005 | Kim |
| 2005/0027445 A1 | 2/2005 | McDonough |
| 2005/0028034 A1 | 2/2005 | Gantman |
| 2005/0031095 A1 | 2/2005 | Pietrowics |
| 2005/0039178 A1 | 2/2005 | Marolia |
| 2005/0041578 A1 | 2/2005 | Huotari |
| 2005/0043037 A1 | 2/2005 | Loppe |
| 2005/0043038 A1 | 2/2005 | Maanoja |
| 2005/0053209 A1 | 3/2005 | D'Evelyn et al. |
| 2005/0062636 A1 | 3/2005 | Conway |
| 2005/0063519 A1 | 3/2005 | James |
| 2005/0071671 A1 | 3/2005 | Karaoguz |
| 2005/0078612 A1 | 4/2005 | Lang |
| 2005/0083911 A1 | 4/2005 | Grabelsky |
| 2005/0085999 A1 | 4/2005 | Onishi |
| 2005/0086467 A1 | 4/2005 | Asokan |
| 2005/0090236 A1 | 4/2005 | Schwinke |
| 2005/0101335 A1 | 5/2005 | Kelly |
| 2005/0107673 A1 | 5/2005 | Ball |
| 2005/0111630 A1 | 5/2005 | Potorney |
| 2005/0112030 A1 | 5/2005 | Gaus |
| 2005/0119012 A1 | 6/2005 | Merheb |
| 2005/0125148 A1 | 6/2005 | Van Buer |
| 2005/0134504 A1 | 6/2005 | Harwood |
| 2005/0135569 A1 | 6/2005 | Dickinson |
| 2005/0136885 A1 | 6/2005 | Kaltsukis |
| 2005/0149430 A1 | 7/2005 | Williams |
| 2005/0159883 A1 | 7/2005 | Humphries |
| 2005/0174991 A1 | 8/2005 | Keagy |
| 2005/0190746 A1 | 9/2005 | Xiong |
| 2005/0190892 A1 | 9/2005 | Dawson |
| 2005/0192822 A1 | 9/2005 | Hartenstein |
| 2005/0201358 A1 | 9/2005 | Nelson |
| 2005/0201528 A1 | 9/2005 | Meer |
| 2005/0201529 A1 | 9/2005 | Nelson |
| 2005/0209995 A1 | 9/2005 | Aksu |
| 2005/0213716 A1 | 9/2005 | Zhu |
| 2005/0219067 A1 | 10/2005 | Chung |
| 2005/0232252 A1 | 10/2005 | Hoover |
| 2005/0239458 A1 | 10/2005 | Hurtta |
| 2005/0242168 A1 | 11/2005 | Tesavis |
| 2005/0255857 A1 | 11/2005 | Kim |
| 2005/0259675 A1 | 11/2005 | Tuohino |
| 2005/0261002 A1 | 11/2005 | Cheng |
| 2005/0265318 A1 | 12/2005 | Khartabil |
| 2005/0271029 A1 | 12/2005 | Iffland |
| 2005/0282518 A1 | 12/2005 | D'Evelyn |
| 2005/0287979 A1 | 12/2005 | Rollender |
| 2005/0289097 A1 | 12/2005 | Trossen |
| 2006/0008065 A1 | 1/2006 | Longman et al. |
| 2006/0019724 A1 | 1/2006 | Bahl |
| 2006/0023747 A1 | 2/2006 | Koren et al. |
| 2006/0026288 A1 | 2/2006 | Acharya |
| 2006/0041375 A1 | 2/2006 | Witmer |
| 2006/0053225 A1 | 3/2006 | Poikselka |
| 2006/0058102 A1 | 3/2006 | Nguyen et al. |
| 2006/0068753 A1 | 3/2006 | Karpen |
| 2006/0069503 A1 | 3/2006 | Suomela |
| 2006/0072729 A1 | 4/2006 | Lee et al. |
| 2006/0074547 A1 | 4/2006 | Kaufman |
| 2006/0077911 A1 | 4/2006 | Shaffer |
| 2006/0088152 A1 | 4/2006 | Green |
| 2006/0104306 A1 | 5/2006 | Adamczkk |
| 2006/0120517 A1 | 6/2006 | Moon |
| 2006/0128395 A1 | 6/2006 | Muhonen |
| 2006/0135177 A1 | 6/2006 | Winterbottom |
| 2006/0188083 A1 | 8/2006 | Breen |
| 2006/0193447 A1 | 8/2006 | Schwartz |
| 2006/0200359 A1 | 9/2006 | Khan |
| 2006/0212558 A1 | 9/2006 | Sahinoja |
| 2006/0212562 A1 | 9/2006 | Kushwaha |
| 2006/0224752 A1 | 10/2006 | Parekh |
| 2006/0233338 A1 | 10/2006 | Venkata |
| 2006/0234639 A1 | 10/2006 | Kushwaha |
| 2006/0234698 A1 | 10/2006 | Fok |
| 2006/0239205 A1 | 10/2006 | Warren |
| 2006/0250987 A1 | 11/2006 | White |
| 2006/0258380 A1 | 11/2006 | Liebowitz |
| 2006/0259365 A1 | 11/2006 | Agarwal et al. |
| 2006/0268120 A1 | 11/2006 | Funakura |
| 2006/0270421 A1 | 11/2006 | Phillips |
| 2006/0281437 A1 | 12/2006 | Cook |
| 2006/0293024 A1 | 12/2006 | Benco |
| 2006/0293066 A1 | 12/2006 | Edge |
| 2007/0003024 A1 | 1/2007 | Olivier |
| 2007/0004461 A1 | 1/2007 | Bathina |
| 2007/0014282 A1 | 1/2007 | Mitchell |
| 2007/0019614 A1 | 1/2007 | Hoffmann |
| 2007/0021908 A1 | 1/2007 | Jaugilas |
| 2007/0022011 A1 | 1/2007 | Altberg et al. |
| 2007/0026854 A1 | 2/2007 | Nath |
| 2007/0026871 A1 | 2/2007 | Wager |
| 2007/0027997 A1 | 2/2007 | Polk |
| 2007/0030539 A1 | 2/2007 | Nath |
| 2007/0032244 A1 | 2/2007 | Counts |
| 2007/0036139 A1 | 2/2007 | Patel |
| 2007/0049288 A1 | 3/2007 | Lamprecht |

(56) References Cited

U.S. PATENT DOCUMENTS

| | | | |
|---|---|---|---|
| 2007/0054676 A1 | 3/2007 | Duan | |
| 2007/0060097 A1 | 3/2007 | Edge | |
| 2007/0072553 A1 | 3/2007 | Barbera | |
| 2007/0081635 A1 | 4/2007 | Croak | |
| 2007/0083911 A1 | 4/2007 | Madden | |
| 2007/0115941 A1 | 5/2007 | Patel | |
| 2007/0121601 A1 | 5/2007 | Kikinis | |
| 2007/0139411 A1 | 6/2007 | Jawerth | |
| 2007/0149166 A1 | 6/2007 | Turcotte | |
| 2007/0149213 A1 | 6/2007 | Lamba | |
| 2007/0162228 A1 | 7/2007 | Mitchell | |
| 2007/0182631 A1 | 8/2007 | Berlinsky | |
| 2007/0201623 A1 | 8/2007 | Hines | |
| 2007/0206568 A1 | 9/2007 | Silver | |
| 2007/0206613 A1 | 9/2007 | Silver | |
| 2007/0208687 A1 | 9/2007 | O'Connor | |
| 2007/0242660 A1 | 10/2007 | Xu | |
| 2007/0253429 A1 | 11/2007 | James | |
| 2007/0254625 A1 | 11/2007 | Edge | |
| 2007/0263610 A1 | 11/2007 | Mitchell | |
| 2007/0270164 A1 | 11/2007 | Maier | |
| 2007/0291733 A1 | 12/2007 | Doran | |
| 2008/0032703 A1 | 2/2008 | Krumm | |
| 2008/0037715 A1 | 2/2008 | Prozeniuk | |
| 2008/0045250 A1 | 2/2008 | Hwang | |
| 2008/0063153 A1 | 3/2008 | Krivorot | |
| 2008/0065775 A1 | 3/2008 | Polk | |
| 2008/0077324 A1 | 3/2008 | Hatano | |
| 2008/0113671 A1* | 5/2008 | Ghozati | H04L 45/00 455/456.1 |
| 2008/0117859 A1 | 5/2008 | Shahidi | |
| 2008/0129475 A1 | 6/2008 | Breed | |
| 2008/0162637 A1 | 7/2008 | Adamczyk | |
| 2008/0176582 A1 | 7/2008 | Ghai | |
| 2008/0186164 A1 | 8/2008 | Emigh | |
| 2008/0195314 A1 | 8/2008 | Green | |
| 2008/0200182 A1 | 8/2008 | Shim | |
| 2008/0214202 A1 | 9/2008 | Toomey | |
| 2008/0220747 A1 | 9/2008 | Ashkenazi | |
| 2008/0288166 A1 | 11/2008 | Onishi | |
| 2009/0003535 A1 | 1/2009 | Grabelsky | |
| 2009/0067417 A1 | 3/2009 | Kalavade | |
| 2009/0097450 A1 | 4/2009 | Wallis | |
| 2009/0113346 A1 | 4/2009 | Wickramasuriya | |
| 2009/0128404 A1 | 5/2009 | Martino | |
| 2009/0177557 A1 | 7/2009 | Klein | |
| 2009/0181698 A1* | 7/2009 | Farmer | H04W 4/02 455/456.3 |
| 2009/0224931 A1 | 9/2009 | Dietz | |
| 2009/0298488 A1 | 12/2009 | Snapp | |
| 2009/0323636 A1 | 12/2009 | Dillon | |
| 2009/0328163 A1 | 12/2009 | Preece | |
| 2010/0003976 A1 | 1/2010 | Zhu | |
| 2010/0004993 A1 | 1/2010 | Troy | |
| 2010/0042592 A1 | 2/2010 | Stolz | |
| 2010/0054220 A1 | 3/2010 | Bischinger et al. | |
| 2010/0067444 A1 | 3/2010 | Faccin | |
| 2010/0167760 A1 | 7/2010 | Kim | |
| 2010/0188992 A1 | 7/2010 | Raleigh | |
| 2010/0198933 A1 | 8/2010 | Smith | |
| 2010/0203902 A1* | 8/2010 | Wachter | H04W 4/022 455/456.3 |
| 2010/0223222 A1 | 9/2010 | Zhou et al. | |
| 2010/0268848 A1 | 10/2010 | Maurya | |
| 2011/0113060 A1 | 5/2011 | Martini | |
| 2011/0165861 A1 | 7/2011 | Wilson et al. | |
| 2011/0231561 A1* | 9/2011 | Pawson | H04W 4/02 709/228 |
| 2011/0249623 A1* | 10/2011 | Wachter | H04W 4/20 370/328 |
| 2012/0046014 A1* | 2/2012 | Wachter | G01S 19/11 455/411 |
| 2012/0202447 A1* | 8/2012 | Edge | H04W 4/02 455/404.2 |
| 2013/0012232 A1 | 1/2013 | Titus | |
| 2013/0212663 A1* | 8/2013 | Edge | H04W 12/06 726/7 |
| 2014/0372616 A1* | 12/2014 | Arisoylu | H04L 67/1002 709/226 |
| 2015/0304452 A1* | 10/2015 | Tran | H04L 9/088 713/168 |

FOREIGN PATENT DOCUMENTS

| | | |
|---|---|---|
| WO | WO02/11407 | 7/2001 |
| WO | WO2004/025941 | 3/2004 |
| WO | WO2007/027166 | 6/2005 |
| WO | WO2005051033 | 6/2005 |

OTHER PUBLICATIONS

Qualcomm CDMA Technologies, LBS Control Plane Roaming—80-VD377-1NP A, 2006, pp. 1-10.

Qualcomm CDMA Technologies, MS Resident User Plane LBS Roaming—80-VC718-1 E, 2006, pp. 1-37.

$3^{rd}$ Generation Partnership Project 2, Position Determination Service Standard for Dual Mode Spread Spectrum Systems, Feb. 16, 2001, pp. i-X, 1-1-1-5, 2-1-2-2, 3-1-3-51, 4-1-4-66, A-1-A2, B-1-B-2, C-1-C-2, D-1-D-2.

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

Extended European Search Report from EPO in European Appl. No. 06827172.5 dated Dec. 29, 2009.

Qualcomm CDMA Technologies, LBS Control Plane/User Plane Overview—80-VD378-1NP B, 2006, pp. 1-36.

Bhalla et al, TELUS, Technology Strategy—LBS Roaming Summit, Sep. 19, 2006.

Alfredo Aguirre, Ilusacell, First and Only Carrier in Mexico with a 3G CDMA Network, 2007.

Mike McMullen, Sprint, LBS Roaming Summit, Sep. 19, 2006.

Nars Haran, U.S. Cellular, Packet Data—Roaming and LBS Overview, Nov. 2, 2007, pp. 1-15.

Location Based Services V2 Roaming Support (non proprietary), 80-V8470-2NP A, dated Jan. 27, 2005, pp. 1-56.

Yilin Ahao, Efficient and reliable date transmission for cellular and GPS based mayday systems, Nov. 1997, IEEE, IEEE Conference on Intelligent Transportation System, 1997. ITSC 97, 555-559.

Examiner's Office Letterin Japanese Patent Application No. 2006-542691 dated Sep. 7, 2009.

JP Laid-Open Gazette No. 2004-158947 (English abstract only).

JP Laid-Open Gazette No. 2007-507123 (counterpart English text US Patent Application Publication No. 2007/0054676).

T. Hattori, "Wireless Broadband Textbook," IDG Japan, Jun. 10, 2002, p. 142-p. 143. (no English text).

Schulzrinne et al., Emergency Services for Internet Telephony Systems draft-schulzrinne-sipping-emergency-arch, IETF Standard Working Draft, Feb. 4, 2004, 1-22.

International Preliminary Report on Patentability receiving in PCT/US2011/02002 dated Nov. 23, 2012.

International Search Report received in PCT/US2011/02001 dated Apr. 27, 2012.

International Search Report received in PCT/US2011/000100 dated Apr. 24, 2012.

International Search Report Received in PCT/US11/01971 dated Feb. 28, 2013.

International Preliminary Report on Patentability receiving in PCT/US2011/02001 dated Nov. 9, 2012.

* cited by examiner

INTELLIGENT LOAD BALANCER ENHANCED ROUTING

The present invention claims priority from U.S. Provisional No. 61/876,355, filed Sep. 11, 2013, entitled "SUPL Session Router—Using Handset Capabilities"; and also from U.S. Provisional No. 61/888,700, filed Oct. 9, 2013, entitled "SI-LB Enhanced Routing—RRLP/LPP", the entirety of both of which is expressly incorporated herein by reference.

BACKGROUND OF THE INVENTION

1. Field of the Invention

This invention relates generally to wireless telecommunication location routing/load balancing—CDMA, GSM, UMTS, IMS/LTE, SUPL, etc.

2. Background of Related Art

The Open Mobile Alliance (OMA) standards working group has defined a Secure User Plane Location (SUPL) standard to support location of SUPL enabled terminals (i.e. mobile devices with secure user plane location (SUPL) support). In particular, the Secure User Plane Location (SUPL) standard is conventionally used to transfer location information between a SUPL location platform (SLP) (i.e. a location server) and a SUPL enabled terminal (SET), for purposes of articulating a current position of the SUPL enabled terminal (SET).

Before a SUPL location platform (SLP) and a SUPL enabled terminal (SET) may exchange location information, the two entities must first establish a SUPL session. In accordance with conventional technology, a SUPL session can either be SET-initiated or network-initiated.

Traditionally, a network-initiated SUPL session begins when a SUPL location platform (SLP) passes a SUPL INIT message to a SUPL enabled terminal (SET). Alternatively, a SET-initiated SUPL session traditionally begins when a SUPL enabled terminal (SET) passes a SUPL START message to a SUPL location platform (SLP).

An intelligent router product, such as an Xypoint® Intelligent Router (XIR), available from TeleCommunication Systems, Inc. of Annapolis, Md., is conventionally integrated between a SUPL location platform (SLP) and a SUPL enabled terminal (SET).

FIG. 7 depicts a conventional network architecture for establishing a SUPL session between a SUPL location platform (SLP) and a SUPL enabled terminal (SET).

In particular, as depicted in FIG. 7, an intelligent router product (e.g. an Xypoint® Intelligent Router (XIR)) 800 is conventionally used during SUPL session setup to route network-initiated SUPL session requests to an originating SUPL server 820a, 820b and to load balance SET 810 initiated SUPL session requests across multiple SUPL servers 820a, 820b. In accordance with conventional technology, an existing intelligent router 800 routes SUPL session requests based on a SUPL version and a roaming status/location identifier identified for a requesting SUPL enabled terminal (SET) 810.

As portrayed in FIG. 7, an existing intelligent router 800 (e.g. Xypoint® Intelligent Router (XIR), also known as a SUPL intelligent load balancer (SILB)) conventionally includes a SUPL session director (SSD) 840 and a global service load balancer 830.

A global service load balancer (GSLB) 830 is typically used to balance SET 810-initiated SUPL session requests across multiple SUPL servers 820a, 820b. In particular, a conventional global service load balancer (GSLB) 830 may balance load by directing client requests across multiple servers 820a, 820b and/or by directing client requests to one or more servers 820a, 820b located within a closest geographic proximity of a requesting client device 810, and/or by directing client requests to servers 820a, 820b deemed best equipped to handle client requests initiated by a requesting client device 810, etc.

When a SUPL session is established between a SUPL location platform (SLP) 820a, 820b and a SUPL enabled terminal (SET) 810, the SUPL enabled terminal (SET) 810 may send a SUPL POS INIT message to the SUPL location platform (SLP) 820a, 820b (via an intermediary intelligent router product 800) to initiate a positioning protocol session therewith. A SUPL POS INIT message conventionally includes a session ID (as indicated in a SUPL session request message), a SET capabilities parameter, a hash of a previously exchanged SUPL session request, and a location identifier, among other parameters. The SET capabilities parameter in the SUPL POS INIT message typically indicates SET-supported positioning methods (e.g. assisted global positioning system (A-GPS)) and SET-supported positioning protocols, e.g., a radio resource location services protocol (RRLP), a long term evolution (LTE) positioning protocol (LLP), etc.

Once a SUPL location platform (SLP) 820a, 820b receives a SUPL POS INIT message from a SUPL enabled terminal (SET) 810, the SUPL location platform (SLP) 820a, 820b can select an appropriate positioning method to use for calculating the current position of the SUPL enabled terminal (SET) 810. A SUPL location platform (SLP) 820a, 820b typically selects an appropriate positioning method for a SUPL enabled terminal (SET) 810 based on SET-supported positioning methods and protocols listed in a received SUPL POS INIT message.

In accordance with conventional technology, a SUPL location platform (SLP) 820a, 820b and a SUPL enabled terminal (SET) 810 exchange positioning messages until a current position of the SUPL enabled terminal (SET) 810 is articulated. Once positioning information is obtained for the SUPL enabled terminal (SET) 810, the SUPL enabled terminal (SET) 810 and the SUPL location platform (SLP) 820a, 820b exchange a SUPL END message to terminate the SUPL session.

Conventional SUPL standards cover a number of networks and positioning technologies. A secure location session manager is known, e.g., U.S. Pat. No. 7,974,235.

The secure user plane location (SUPL) standard is a conventional standard used to exchange location information between a SUPL enabled terminal (SET) (i.e. a mobile device with secure user plane location (SUPL) standard support) and a SUPL location platform (i.e. a location server), for purposes of articulating a current position of the SUPL enabled terminal (SET). To exchange positioning messages, a SUPL location platform (SLP) and a SUPL enabled terminal (SET) must first establish a SUPL session. A SUPL session may either be SET-initiated or network-initiated.

When multiple SUPL servers (e.g. SUPL location platforms) are deployed in a network for purposes of load sharing and high availability, a couple issues may arise. First, in network-initiated call flows, open mobile alliance (OMA) SUPL version 1 and SUPL version 2 specifications do not permit a SUPL enabled terminal (SET) to respond directly to an originating SUPL server (e.g. a SUPL location platform (SLP)). Second, open mobile alliance (OMA)

SUPL version 1 and SUPL version 2 specifications do not address a global service load balancing (GSLB) functionality for SET-initiated calls.

An intelligent router is conventionally integrated between a SUPL enabled terminal (SET) and a SUPL server (e.g. a SUPL location platform (SLP)) to provide appropriate session binding for network-initiated call flows and to provide global service load balancing (GSLB) for SET-initiated call flows.

In the context of an intelligent router, a SET-initiated SUPL session is identified as a message exchange sequence that begins when a SUPL START message (that does not include a SUPL location platform (SLP) identifier (ID)), transmitted by a SUPL enabled terminal (SET) (i.e. a mobile device with secure user plane location (SUPL) support), is received at a SUPL location platform (SLP) (i.e. a location server). A SET-initiated SUPL session ends when a SUPL END response is received at a SUPL enabled terminal (SET) or a SUPL location platform (SLP), or when a connection is closed due to termination by a peer or due to expiration of a connection inactivity timer.

Moreover, a network-initiated SUPL session is identified as a message exchange sequence that begins when a SUPL INIT message, or any other message (excluding a SUPL START message) that has both SUPL enabled terminal (SET) and SUPL location platform (SLP) session IDs populated, is received at a SUPL enabled terminal (SET). A network-initiated SUPL session ends when a first SUPL END message is exchanged between a SUPL enabled terminal (SET) and a SUPL location platform (SLP), or when a connection is closed due to termination by a peer or due to expiration of a connection inactivity timer.

FIG. 8 depicts conventional intelligent routing logic.

In particular, as portrayed in FIG. 8, existing intelligent routing logic routes SET-initiated SUPL session requests (e.g. SUPL START messages) to a target SUPL location platform (SLP) 70a, 70b, 72a, 72b based on a SUPL version and a roaming status/location ID identified for the requesting SUPL enabled terminal (SET).

In particular, as portrayed in step 700 of FIG. 8, existing intelligent routing logic receives and processes a SUPL START message initiated by a SUPL enabled terminal (SET).

As shown in step 702, the intelligent router then checks mobile country code (MCC)/mobile network code (MNC) information for the requesting SUPL enabled terminal (SET) to determine whether or not the SUPL enabled terminal (SET) is roaming. The roamed-to SUPL server may be the same operator as the HOME SUPL Server or the server may be in a different operator. This allows for a sophisticated inter-operator roaming deployment without the need for the operators to implement the OMA Roaming Location Protocol (RLP).

As portrayed in step 704, if the intelligent router finds that the SUPL enabled terminal (SET) is not roaming, then the intelligent router routes the SUPL START message to either a home SUPL location platform (SLP) SUPL version 1 server 70a or a home SUPL location platform (SLP) SUPL version 2 server 72a, depending on which version of SUPL the SUPL enabled terminal (SET) is supporting, e.g., SUPL 1.0 or SUPL 2.0.

Alternatively, as shown in step 706, if the intelligent router determines that the SUPL enabled terminal (SET) is roaming, then the intelligent router routes the SUPL START message to either a roaming SUPL location platform (SLP) SUPL version 1 server 70b or a roaming SUPL location platform (SLP) SUPL version 2 server 72b, depending on which version of SUPL the SUPL enabled terminal (SET) is supporting, e.g., SUPL 1.0 or SUPL 2.0.

SUMMARY OF THE INVENTION

A method and apparatus for routing a SET-initiated SUPL session request based on positioning protocols supported by a requesting SUPL enabled terminal (SET) comprises enhanced intelligent routing logic. In particular, intelligent routing logic is enhanced to route and load balance a SET-initiated SUPL session request to SUPL servers that support at least one positioning protocol supported by a requesting SUPL enabled terminal (SET).

Inventive intelligent routing logic preferably routes SET-initiated SUPL session requests to SUPL 2.0 radio resource location protocol (RRLP) servers, SUPL 1.0 radio resource location protocol (RRLP) servers, and newly configured LTE positioning protocol (LPP) servers. Routing is determined based on SET capabilities of a requesting SET, a roaming status of a requesting SET, a SUPL version supported by a requesting SET, and/or whether or not enhanced routing logic is enabled.

In accordance with the principles of the present invention, enhanced intelligent routing logic can be enabled or disabled. When enhanced intelligent routing logic is enabled, the intelligent router routes SET-initiated SUPL session requests based on SET capabilities (e.g. positioning protocol capabilities) and a roaming status/location identifier identified for a requesting SUPL enabled terminal (SET). Alternatively, when enhanced routing logic is disabled, the intelligent router routes SET-initiated SUPL session requests in a manner consistent with conventional technology, i.e., based on a SUPL version and a roaming status/location identifier identified for a requesting SUPL enabled terminal (SET).

More particularly, when enhanced intelligent routing logic is enabled, and a pos protocol field in a SET capabilities parameter of a SUPL START message (i.e. a SET-initiated SUPL session request message) indicates that a requesting SUPL enabled terminal (SET) supports a long term evolution (LTE) positioning protocol (LPP), only, new alias fully qualified domain names (FQDNs) are used to load balance the session request message to newly configured SUPL servers that support the long term evolution (LTE) positioning protocol (LPP), only (i.e LPP SUPL servers).

Alternatively, when a pos protocol field in a SET capabilities parameter of a SUPL START message indicates that a requesting SUPL enabled terminal (SET) supports a radio resource location services protocol (RRLP), in addition to or in exclusion of a long term evolution (LTE) positioning protocol (LPP), existing alias fully qualified domain names (FQDNs) are preferably used to route the session request message to SUPL servers that support a radio resource location services protocol (RRLP), in addition to or in exclusion of other positioning protocols (i.e. a 1.0 or 2.0 RRLP SUPL server).

A global service load balancer (GSLB) functionality on the intelligent router load balances a SUPL session request to a target SUPL server (e.g. SUPL location platform) after determining the roaming status of the requesting SUPL enabled terminal (SET).

In accordance with the principles of the present invention, an intelligent router may be further enhanced to include support for SUPL intelligent off load (SI-OL) based on SET capabilities. In this particular embodiment of the present invention, an intelligent router may be enhanced to offload all or part of SET-initiated traffic to alternative servers based on the capabilities of a requesting SET.

The following four deployment options may be implemented to provide intelligent router SUPL intelligent off load (SI-OL): (1) addition of a virtual machine to a global service load balancer (GSLB) on an intelligent router platform, (2) implementation of additional servers on an intelligent router platform, (3) remote management of intelligent router services (capacity offload), and (4) implementation of an intelligent router blade server architecture.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
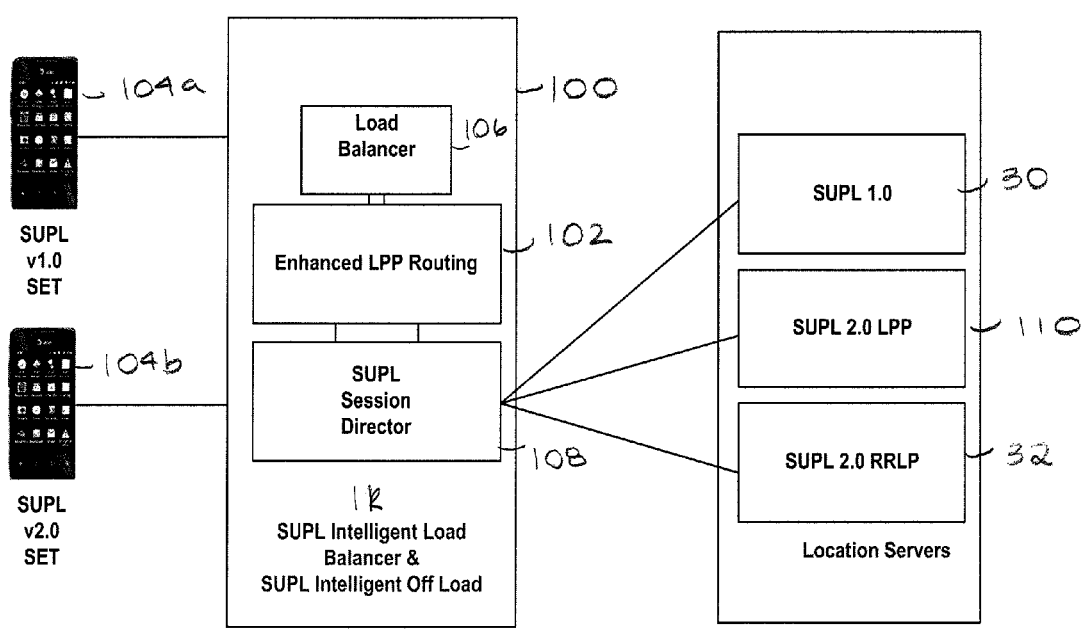
FIG. 1 depicts an illustrative example of an intelligent router with enhanced routing logic, in accordance with the principles of the present invention.

The present invention augments an intelligent router server, such as an Xypoint® Intelligent Router (XIR) commercially available from TeleCommunication Systems, Inc. in Annapolis, Md., to include functionality that uses secure user plane location (SUPL) fields, SET capabilities and location ID, in combination with a configured or provisioned routing policy, to route and load balance a SUPL enabled terminal (SET)-initiated SUPL session request to a SUPL server (e.g. a SUPL location platform (SLP)) or a group of SUPL servers, based on the capabilities (e.g. positioning protocol capabilities) of the requesting SUPL enabled terminal (SET).

Today, many SUPL enabled terminals (SETs) contain multiple cellular radios to enable support for a multitude of networks (e.g. code division multiple access (CDMA), global system for mobile communications (GSM), long term evolution (LTE)/IP multimedia subsystem (IMS), Wi-Fi/IP multimedia subsystem (IMS), etc.) and a multitude of positioning technologies. However, SUPL location platforms (SLPs) are not guaranteed to support all positioning technologies.

The inventors herein have realized that existing intelligent router systems do not check whether or not a target secure user plane location (SUPL) server supports a positioning protocol required by a requesting SUPL enabled terminal (SET) before forwarding a SUPL session request initiated by that SUPL enabled terminal (SET) to the target SUPL server. Unfortunately, if a SET-initiated SUPL session request is routed to a SUPL server that does not support a positioning protocol required by the requesting SUPL enabled terminal (SET), or a capability required by the requesting SUPL enabled terminal (SET), then the positioning session will likely fail.

For purposes of avoiding failed positioning sessions, carriers are currently forced to provide SUPL servers that support all positioning capabilities across all devices deployed in their carrier network (or networks, in the case that overlay networks are deployed), which can become quite complex. SUPL location determination gets even more complex for carriers when a device is roaming and a home SUPL location platform (SLP) does not have required information and/or does not support required positioning technologies, and roaming has not been implemented.

In accordance with the principles of the present invention, intelligent routing logic is enhanced to route SET-initiated SUPL session requests based on positioning protocols supported by requesting SUPL enabled terminals (SETs). More particularly, the present invention enhances intelligent routing logic to route and load balance a SET-initiated SUPL session request to a SUPL server that supports at least one positioning protocol supported by the requesting SUPL enabled terminal (SET). Enhanced intelligent routing logic effectively minimizes the need for carriers/service providers to provide support for all positioning technologies.

A SUPL enabled terminal (SET) conventionally indicates supported positioning protocols in a SET capabilities parameter of a SUPL START message (i.e. a SUPL session request message). In particular, a SET capabilities parameter in a SUPL START message includes a mandatory pos protocol field, which indicates SET-supported positioning protocols, such as a long term evolution (LTE) positioning protocol (LPP) and/or a radio resource location services protocol (RRLP).

In accordance with the principles of the present invention, when a pos protocol field in a SET capabilities parameter of a SUPL START message indicates that a requesting SUPL enabled terminal (SET) supports only a long term evolution (LTE) positioning protocol (LPP), new alias fully qualified domain names (FQDNs) are preferably used to load balance the session request message to newly configured SUPL servers (e.g. SUPL location platforms (SPLs)) that are dedicated to supporting only the long term evolution (LTE) positioning protocol (LPP). A global service load balancer (GSLB) functionality on the intelligent router then load balances the SUPL session request to a target SUPL server (e.g. SUPL location platform) after determining the roaming status of the requesting SUPL enabled terminal (SET) (which is identified via mobile country code (MCC)/mobile network code (MNC) information indicated in a location ID field of the SET-initiated SUPL START message).

Alternatively, when a pos protocol field in a SET capabilities parameter of a SUPL START message indicates that a requesting SUPL enabled terminal (SET) supports a radio resource location services protocol (RRLP), in addition to or in exclusion of a long term evolution (LTE) positioning protocol (LPP), existing alias fully qualified domain names (FQDNs) are preferably used to route the session request message to SUPL servers that support a radio resource location services protocol (RRLP), in addition to or in exclusion of other positioning protocols. A global service load balancer (GSLB) on the intelligent router then load balances the session request to a target SUPL server, in a manner consistent with conventional technology.

FIG. 1 depicts an illustrative example of an intelligent router with enhanced routing logic, in accordance with the principles of the present invention.

In particular, as depicted in FIG. 1, an intelligent router 100, such as an Xypoint® Intelligent Router (XIR)/SUPL intelligent load balancer (SILB), with enhanced routing logic 102 preferably services SUPL version 1.0 SUPL enabled terminals (SETs) 104a and SUPL version 2.0 SUPL enabled terminals (SETs) 104b, and preferably comprises a conventional global service load balancer (GSLB) 106 and a SUPL session director (SSD) 108.

Also portrayed in FIG. 1, inventive intelligent router 100 routing logic preferably routes SET-initiated SUPL session requests to SUPL 2.0 radio resource location protocol (RRLP) servers 32, SUPL 1.0 radio resource location protocol (RRLP) servers 30, and newly configured LTE positioning protocol (LPP) servers 110.

In accordance with the principles of the present invention, the intelligent router 100 global service load balancer (GSLB) 106 functionality is responsible for load balancing session requests to inventive LTE positioning protocol (LPP) servers (i.e. servers that support a LTE positioning protocol (LPP) only) 110 and to radio resource location services protocol (RRLP) servers (i.e. servers that support a radio resource location services protocol (RRLP) and other positioning protocols) 30, 32. The global service load balancer (GSLB) load balancing feature 106 allows carriers to fine-tune which servers are to be identified as LTE positioning protocol (LPP) servers 110 and which servers are to be identified as radio resource location services protocol (RRLP) servers 30, 32. In accordance with the principles of the present invention, the global service load balancer (GSLB) configuration is updated to configure new servers to handle SUPL 1.0 and SUPL 2.0 radio resource location services protocol (RRLP) sessions.

A global service load balancer (GSLB) 106 is a conventional 3rd party product and only requirements of functionalities relevant to intelligent routing logic 102 are covered within this specification.

In accordance with the principles of the present invention, enhanced intelligent router 100 routing logic 102 can be enabled and disabled. In particular, when enhanced routing logic 102 is enabled, the intelligent router 100 routes SET-initiated SUPL session requests based on SET capabilities (e.g. positioning protocol capabilities) and a roaming status/location ID identified for a requesting SUPL enabled terminal (SET) 104a, 104b. Alternatively, when enhanced routing logic 102 is disabled, the intelligent router 100 routes SET-initiated SUPL session requests in a manner consistent with conventional technology, i.e., based on a SUPL version and a roaming status/location ID identified for a requesting SUPL enabled terminal (SET) 104a, 104b.

In accordance with the principles of the present invention, inventive intelligent router 100 routing logic additionally includes peg counters to track the number of SET-initiated sessions routed to LTE positioning protocol (LPP) servers 110 and the number of SET-initiated sessions routed to radio resource location services protocol (RRLP) servers 30, 32.

Figure 2:
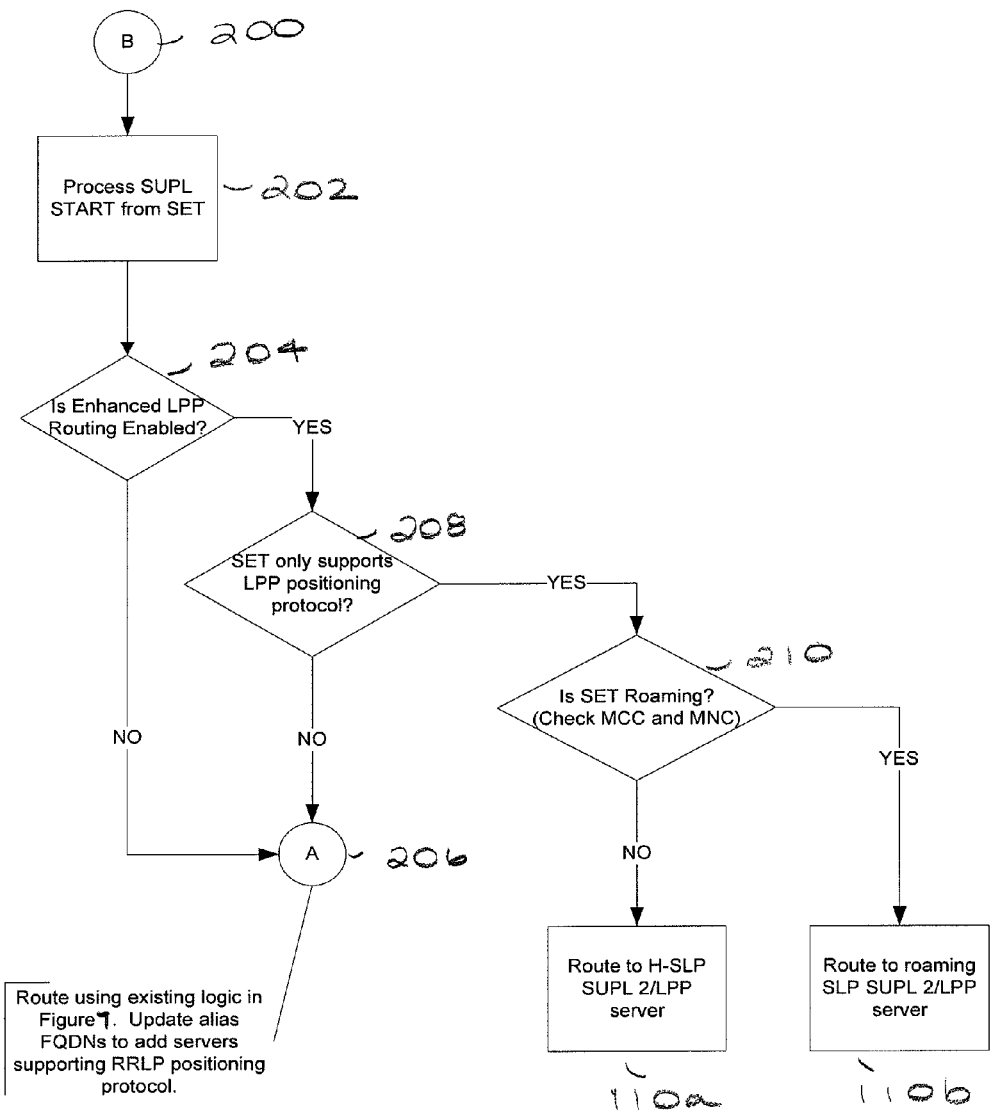
FIG. 2 portrays an exemplary high level SUPL 2.0 SET-initiated SUPL session call flow, in accordance with the principles of the present invention.

FIG. 2 portrays an exemplary high level SUPL 2.0 SET-initiated SUPL session call flow, in accordance with the principles of the present invention.

In particular, as depicted in step 200, a SET 104a, 104b initiates a SUPL session by transmitting a SUPL START message and one or more SUPL TRIGGERED START messages to an intelligent router 100. A SUPL START message/SUPL TRIGGERED START message must include a SET capabilities parameter.

As portrayed in step 202, the intelligent router 100, receives the SUPL START message and one or more SUPL TRIGGERED START messages, and inspects the following message fields separately, or in combination, depending on a predefined routing configuration/policy: pos technology, positioning protocol (e.g. RRLP, LPP, IS801, etc.), positioning protocol version (e.g. RRLP, LPP, etc.), galileo and additional navigation satellite systems (GANSS) positioning methods, galileo and additional navigation satellite systems (GANSS) positioning modes, preferred method specified by the SUPL enabled terminal (SET) 104a. 104b, service capabilities (SUPL TRIGGERED START), event trigger capabilities, supported bearers, serving cell information (Location ID), and multiple location ID information.

As portrayed in step 204, the intelligent router 100 subsequently determines whether or not enhanced routing logic 102 is enabled.

Figure 7:
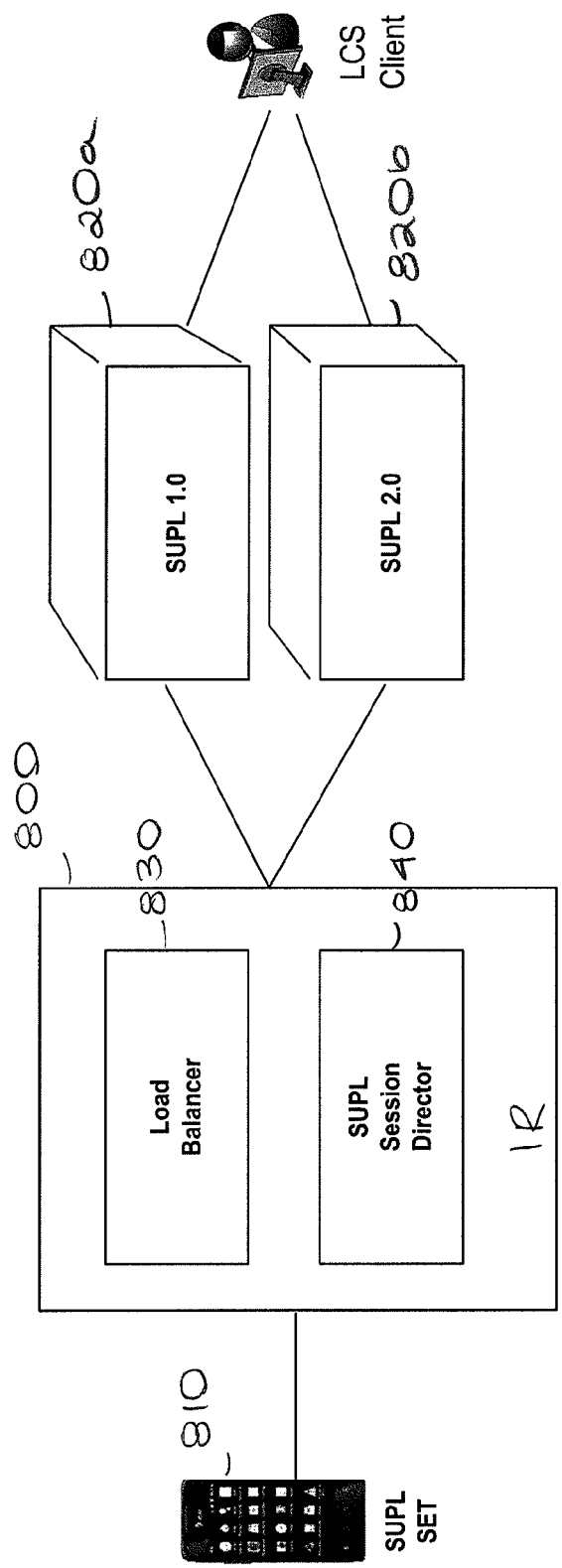
FIG. 7 depicts a conventional network architecture for establishing a SUPL session between a SUPL location platform (SLP) and a SUPL enabled terminal (SET).
Figure 8:
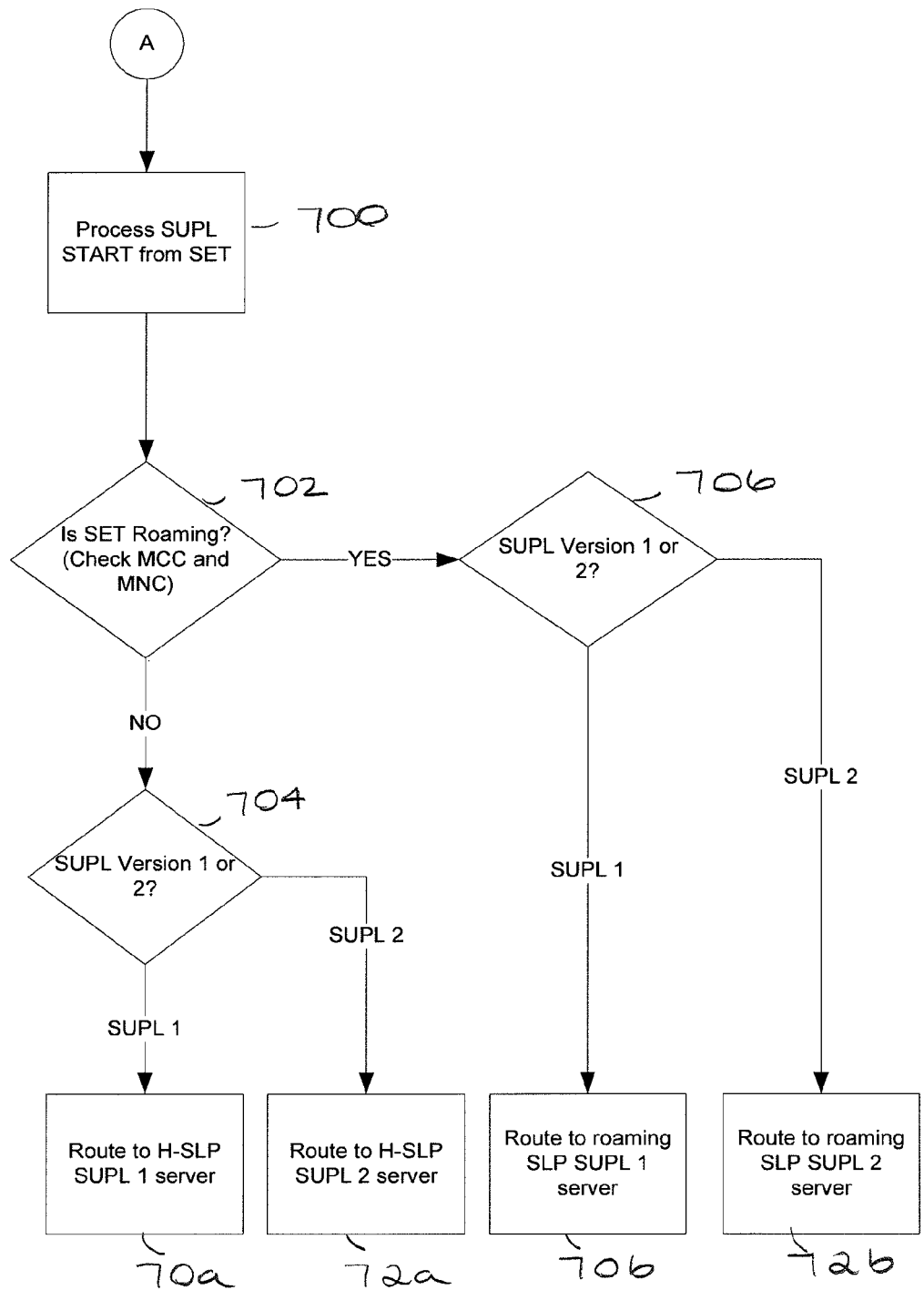
FIG. 8 depicts conventional intelligent routing logic.

As shown in step 206, if the intelligent router 100 determines that enhanced routing logic 102 is not enabled (e.g. an enhanced routing flag is set to OFF), then the intelligent router 100 routes the SUPL START message and SUPL TRIGGERED START messages (i.e. SET-initiated SUPL session request message) in a manner consistent with conventional technology (see FIG. 7).

Otherwise, as portrayed in step 208, if the intelligent router 100 determines that enhanced routing logic 102 is enabled (e.g. an enhanced routing flag is set to 'ON'), then the intelligent router 100 checks the SET capabilities parameter in the SUPL START message/SUPL TRIGGERED START messages to determine whether or not the requesting SUPL enabled terminal (SET) 104a, 104b supports an LTE positioning protocol (LPP), only.

If the intelligent router 100 determines that the SUPL enabled terminal (SET) 104a, 104b does not support an LTE positioning protocol (LPP), only, then the intelligent router 100 routes the SUPL START message in a manner consistent with conventional technology (step 206, see FIG. 7).

Alternatively, as shown in step 210, if it is determined that the SUPL enabled terminal (SET) 104a, 104b does support an LTE positioning protocol (LPP), only, then the intelligent router 100 checks mobile country code (MCC) and mobile network code (MNC) information indicated in the location ID and/or multiple location ID message parameter of the received SUPL START message/SUPL TRIGGERED START messages to determine if the SUPL enabled terminal (SET) 104a, 104b is roaming.

If the SUPL enabled terminal (SET) 104a, 104b is roaming, then the intelligent router 100 routes the SUPL START message/SUPL TRIGGERED START messages to a roaming SUPL location platform (SLP) SUPL version 2/LTE positioning protocol (LPP) server 110b.

Alternatively, if the SUPL enabled terminal (SET) 104a, 104b is not roaming, then the intelligent router 100 routes the SUPL START message/SUPL TRIGGERED START messages to a home SUPL location platform (SLP) SUPL version 2/LTE positioning protocol (LPP) server 110a.

Hence, as portrayed in FIG. 2, enhanced intelligent routing logic 102 uses a location ID message parameter (e.g.

mobile country code (MCC)/mobile network code (MNC)) and a multiple location ID message parameter (optional), in combination with a SET capabilities message parameter, to route and load balance SET-initiated SUPL session request messages to a nearest server 110, 30, 32 that is capable of articulating a current position of the SUPL enabled terminal (SET) 104a, 104b.

For example, if a location ID field in a SUPL START message/SUPL TRIGGERED START message indicates LTE cell information, and a SET capabilities field in the SUPL START message/SUPL TRIGGERED START message indicates support for the LTE positioning protocol (LPP), only, then in accordance with the principles of the present invention, the intelligent router 100 routes the SET-initiated SUPL session request messages to alias fully qualified domain names (FQDNs) that represent servers 110 that support a LTE positioning protocol (LPP), only.

When routing session request messages to an alias fully qualified domain name (FQDN), the intelligent router 100 preferably load balances the requests using a global service load balancer (GSLB) 106, which round-robins the requests for domain name service (DNS) to a specific alias fully qualified domain name (FQDN).

In accordance with the principles of the present invention, an intelligent router 100 may be further enhanced to include support for the following capabilities: SUPL intelligent off load (SI-OL) based on SET capabilities, SET traffic load balancing across new SUPL intelligent offload (SI-OL) nodes (based on a new weighted algorithm), and SET initiated/based support for assistance data.

In particular, inventive routing logic 102 may be further enhanced to enable carriers to offload traffic for specific regions to a group of SUPL location platforms (SLPs). One or more of the following SUPL START message fields can be used, in combination or separately, to offload all or part of SET-initiated traffic to alternative servers: a positioning technology parameter, a supported positioning protocol (e.g., RRLP, LPP, IS801, etc.) parameter, a preferred positioning method specified by SET parameter, a serving cell information parameter, and/or a multiple location ID information parameter.

In accordance with the principles of the present invention, offloading SET-initiated SET based location requests from existing SUPL servers based on SET capabilities may result in peaks of 630 transactions per second (TPS). In accordance with the principles of the present invention, a radio resource location services protocol (RRLP) and an LTE positioning protocol (LPP) are supported for SUPL intelligent off load (SI-OL) capabilities. Moreover, cell site and measurement data for SUPL intelligent off load (SI-OL) may include global system for mobile communications (GSM), universal mobile telecommunications system (UMTS), long term evolution (LTE) data, etc., a target transaction per second (TPS) per node for SUPL intelligent off load (SI-OL) is 500 transactions per second (TPS), with a network license of 1500 transactions per second (TPS).

SET-initiated/based cross-site scripting (XSS) capabilities can be migrated to the intelligent router 100 for radio resource location services protocol (RRLP) for SUPL 2.0, SET-based assisted-GPS, enhanced cell ID flows supported by SUPL intelligent off load (SI-OL), additional measurement and assistance data delivery for the LTE positioning protocol (LPP), and cell database updates and provisioning to support long term evolution (LTE) technology.

Further, operations, administration, and management (OA&M) updates for enabling SUPL intelligent off load (SI-OL) based on SET capabilities may include: integration of SUPL intelligent offload (SI-OL) nodes into dashboard, operational metrics and location detail records, an extension of existing location detail records to include new fields, network data provisioning using an existing format, and integration via an existing Xypoint reference network for satellite assistance data.

The following four deployment options may be implemented to provide intelligent router SUPL intelligent off load (SI-OL) capabilities: (1) addition of a virtual machine to a global service load balancer (GSLB) 106 on the intelligent router 100 platform, (2) implementation of additional servers on the intelligent router 100 platform, (3) remote management of intelligent router 100 services (capacity offload), and (4) implementation of an intelligent router 100 blade server architecture.

Figure 3:
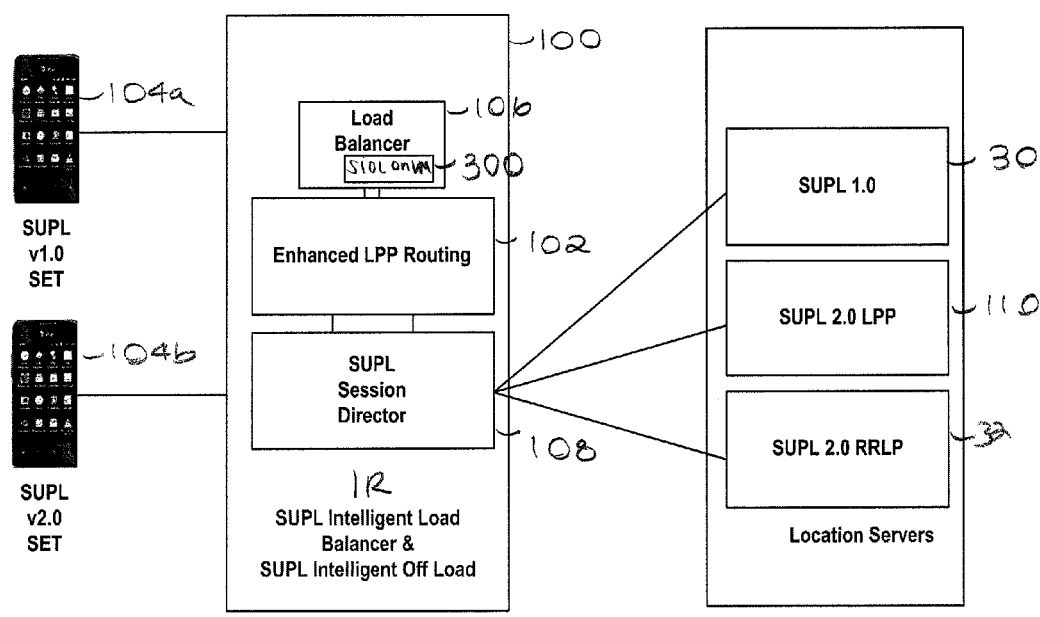
FIG. 3 depicts an exemplary virtual machine deployment option for enabling intelligent router SUPL intelligent off load (SI-OL), in accordance with the principles of the present invention.

FIG. 3 depicts an exemplary virtual machine deployment option for enabling SUPL intelligent off load (SI-OL) capabilities via an intelligent router, in accordance with the principles of the present invention.

As depicted in FIG. 3, a virtual machine 300 is implemented on a global service load balancer (GSLB) 106 on the intelligent router 100 platform for purposes of providing SUPL intelligent off load (SI-OL) based on SET capabilities. The virtual machine 300 deployment option isolates load balancing processes and allows for inter process intelligent router SUPL communication. In this embodiment the global service load balancers 106 may not be completely isolated, with a possible competition for system resources at high TPS levels.

Figure 4:
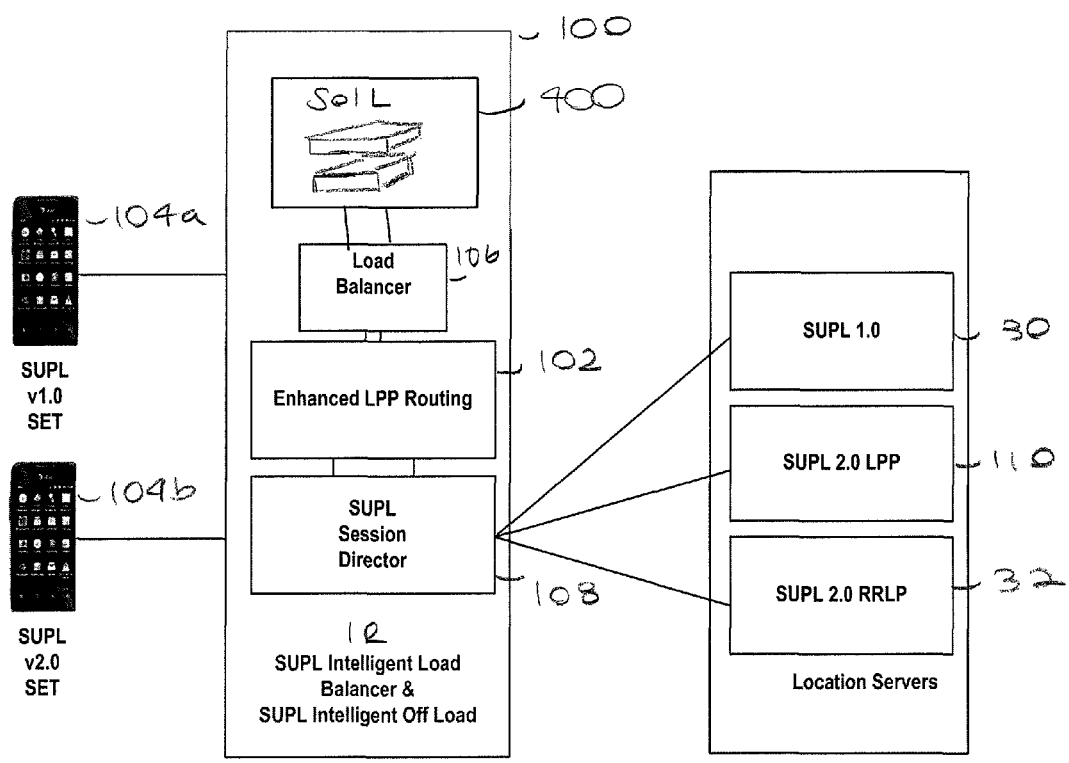
FIG. 4 depicts exemplary additional servers implemented on an intelligent router for purposes of providing SUPL intelligent off load (SI-OL) based on SET capabilities, in accordance with the principles of the present invention.

FIG. 4 depicts exemplary servers added to an intelligent router for purposes of providing SUPL intelligent off load (SI-OL) based on SET capabilities, in accordance with the principles of the present invention.

As depicted in FIG. 4, two new servers (e.g. linux servers) 400 are added to an existing intelligent router 100 architecture to enable SUPL intelligent offload (SI-OL) based on SET capabilities. This embodiment is preferably completely isolated from intelligent router 100 load balancing functionalities 106, network impacts are incurred remotely, and intelligent router 100 SUPL communication is inter process.

Figure 5:
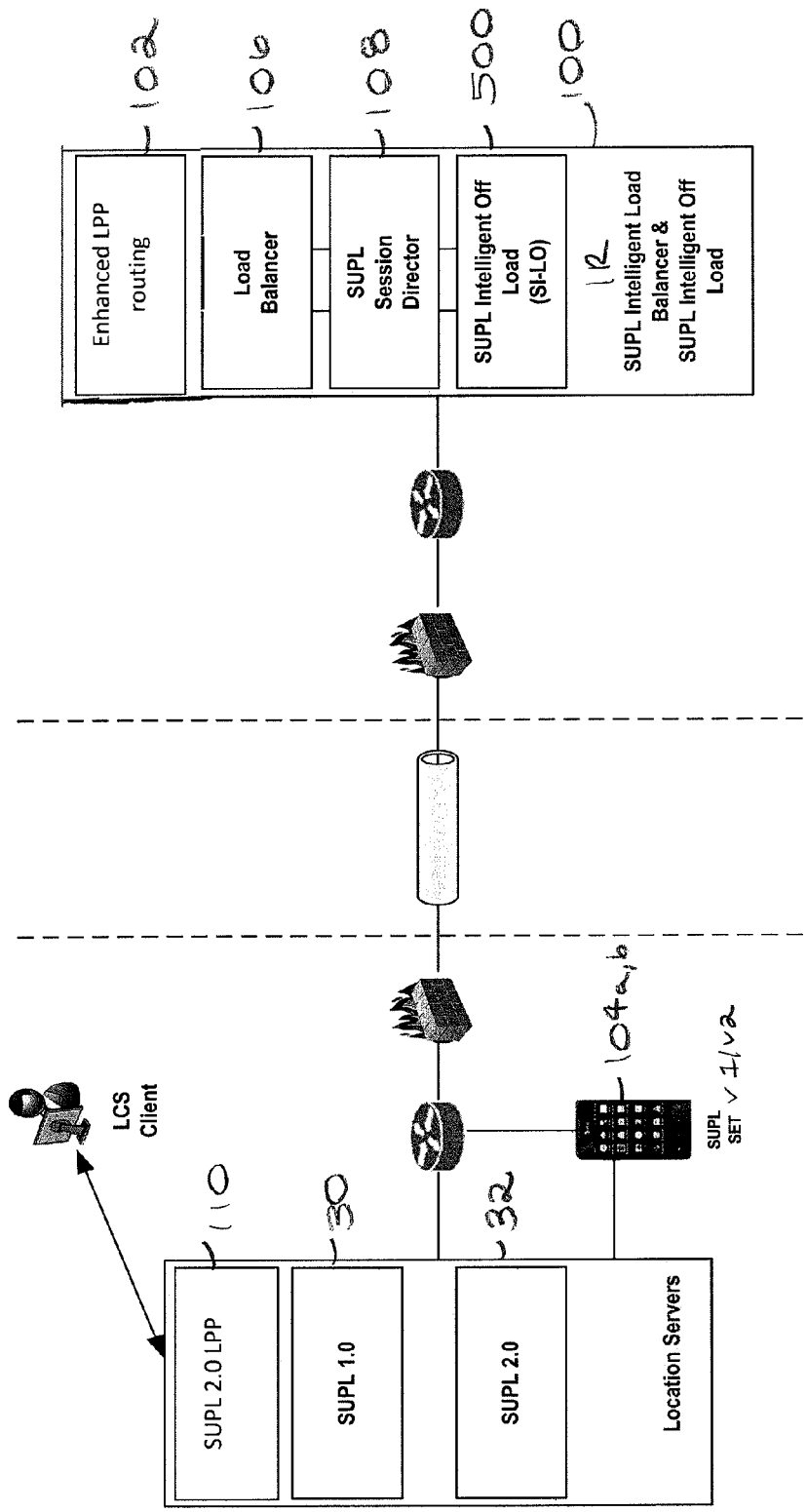
FIG. 5 depicts exemplary remote management of intelligent router services (capacity offload) for purposes of providing SUPL intelligent offload (SI-OL) based on SET capabilities, in accordance with the principles of the present invention.

FIG. 5 depicts exemplary remote management of intelligent router services (capacity offload) for purposes of providing SUPL intelligent offload (SI-OL) based on SET capabilities, in accordance with the principles of the present invention.

As depicted in FIG. 5, a remotely managed intelligent router 500 includes a global service load balancer (GSLB) 106, a SUPL session director 108, and a SUPL intelligent offload (SI-OL) module 510. This embodiment is preferably completely isolated from the load balancer 106, a blade system can be deployed in a new data center when ready, and TPS growth can be implanted via use of additional blades, as needed. This embodiment may require the most network carrier changes from conventional systems. Intelligent router 100 SUPL communication is encrypted ULP.

Figure 6:
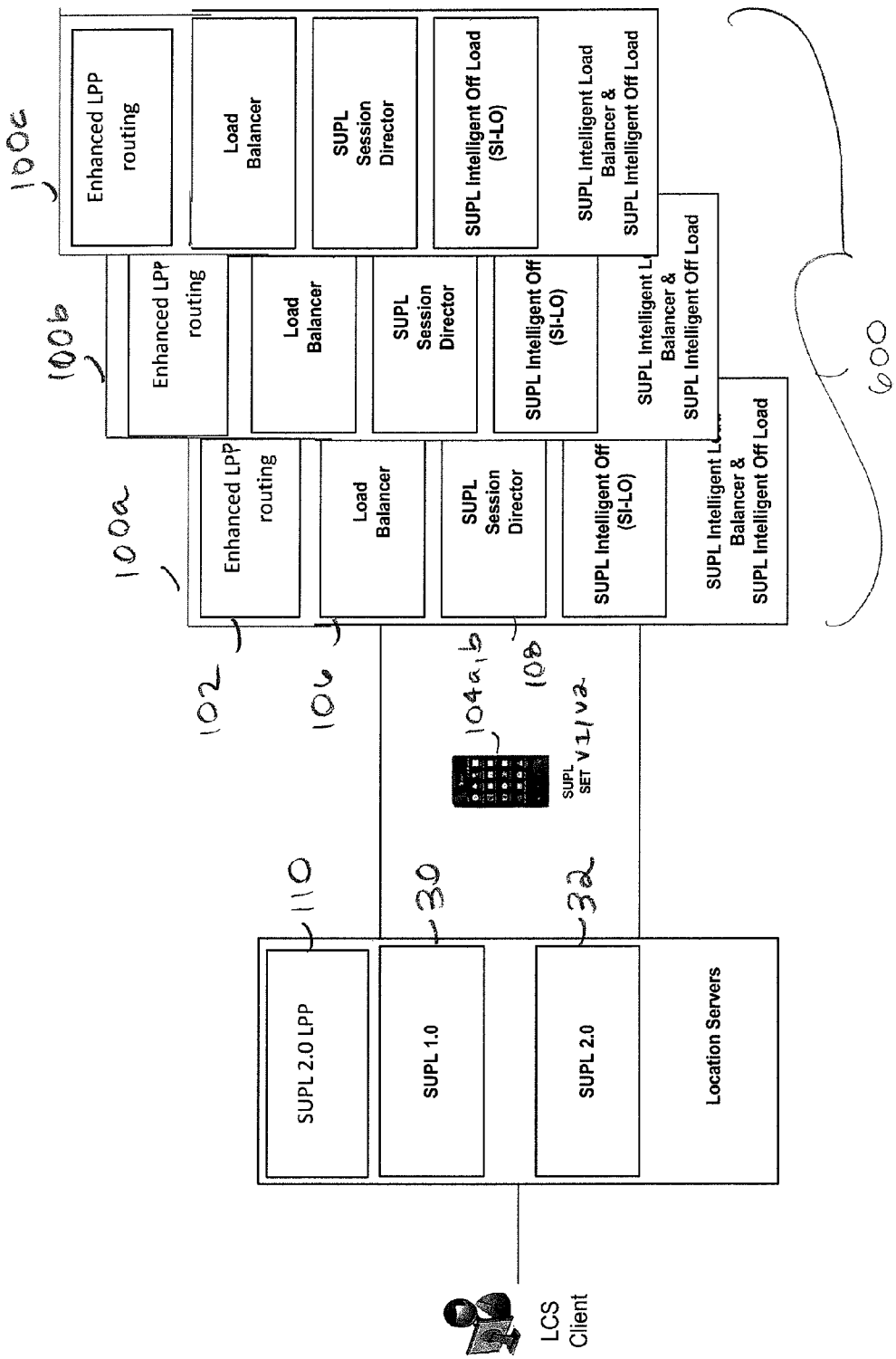
FIG. 6 depicts an exemplary intelligent router blade architecture for providing SUPL intelligent offload (SI-OL) based on SET capabilities, in accordance with the principles of the present invention.

FIG. 6 depicts an exemplary intelligent router blade architecture for providing SUPL intelligent offload (SI-OL) based on SET capabilities, in accordance with the principles of the present invention.

As depicted in FIG. 6, an intelligent router 100 blade server architecture 600 can be used to provide SUPL intelligent offload (SI-OL). This embodiment may have impact on capacity requirements.

The present invention has particular applicability to carriers and service providers that support the secure user plane location (SUPL) protocol.

While the invention has been described with reference to the exemplary embodiments thereof, those skilled in the art will be able to make various modifications to the described embodiments of the invention without departing from the true spirit and scope of the invention.

What is claimed is:

1. An intelligent router to route a Secure User Plane Location (SUPL) enabled terminal (SET)-initiated SUPL session request to a SUPL server based on SET capabilities, comprising:
   a global service load balancer (GSLB) to load balance SUPL sessions among a plurality of SUPL servers, wherein a given SUPL server of said plurality of SUPL servers supports a given set of positioning protocols and another SUPL server of said plurality of SUPL server supports another set of positioning protocols, different from said given set of positioning protocols: a SUPL session director; and an enhanced router to;
   receive a SET capabilities parameter in a SET-initiated SUPL session request to identify a SET-supported positioning protocol; and
   select a target SUPL server from said given SUPL server and said other SUPL server based on a match between said identified SET-supported positioning protocol and either a positioning protocol in said given set of positioning protocols supported by said given SUPL server or a positioning protocol in said other set of protocols supported by said other SUPL server;
   route the SET-initiated SUPL session request to said target SUPL server.

2. The intelligent router to route a SET-initiated SUPL session request to a SUPL server based on SET capabilities according to claim 1, wherein:
   said enhanced router further routes based on a roaming status of said requesting SUPL enabled terminal (SET).

3. The intelligent router to route a SET-initiated SUPL session request to a SUPL server based on SET capabilities according to claim 1, wherein:
   said enhanced router routes said SET-initiated SUPL session request to said target SUPL server, in response to determining that said target SUPL server supports a home long term evolution (LTE) positioning protocol (LPP) server and said identified SET capability parameter indicates support of only a LTE positioning protocol (LPP).

4. The intelligent router to route a SET-initiated SUPL session request to a SUPL server based on SET capabilities according to claim 1, wherein:
   said enhanced router routes said SET-initiated SUPL session request to said target SUPL server, in response to determining that said target SUPL server supports a home radio resource location services protocol (RRLP) server said said identified SET capability parameter indicates no support of an LTE positioning protocol (LPP).

5. The intelligent router to route a SET-initiated SUPL session request to a SUPL server based on SET capabilities according to claim 1, wherein:
   said enhanced router routes said SET-initiated SUPL session request based on a SUPL version and a roaming status identified for said requesting SUPL enabled terminal (SET).

6. The intelligent router to route a SET-initiated SUPL session request to a SUPL server based on SET capabilities according to claim 1, wherein said enhanced router comprises:
   a peg counter to track a number of SET-initiated SUPL session requests routed to an LTE positioning protocol (LPP) server of said plurality of SUPL servers, and a number of SET-initiated SUPL session requests routed to a radio resource location services protocol (RRLP) server of said plurality of SUPL servers.

7. The intelligent router to route a SET-initiated SUPL session request to a SUPL server based on SET capabilities according to claim 1, wherein said global service load balancer (GSLB) comprises:
   a SUPL intelligent offload module to enable SUPL intelligent off load (SI-OL).

8. The intelligent router to route a SET-initiated SUPL session request to a SUPL server based on SET capabilities according to claim 1, wherein:
   said intelligent router is implemented in a blade architecture to enable SUPL intelligent off load (SI-OL).

9. The intelligent router to route a SET-initiated SUPL session request to a SUPL server based on SET capabilities according to claim 1, further comprising:
   a remote management module to enable SUPL intelligent off load (SI-OL).

10. The intelligent router to route a SET-initiated SUPL session request to a SUPL server based on SET capabilities according to claim 1, further comprising:
    a SUPL intelligent offload server to enable SUPL intelligent off load (SI-OL).

11. The intelligent router to route a SET-initiated SUPL session request to a SUPL server based on SET capabilities according to claim 1, wherein:
    said global service load balancer (GSLB) load balances between a SUPL 1.0 radio resource location services protocol (RRLP) session, and a SUPL 2.0 radio resource location services protocol (RRLP) session.

12. A method of intelligently load balancing, a Secure User Plane Location (SUPL) enabled terminal (SET)-initiated SUPL session request to a target SUPL server based on SET capabilities, comprising:
    receiving a SUPL session request from a SUPL enabled terminal;
    determining from a SET capabilities parameter of said SUPL session request to determine if said requesting SUPL enabled terminal (SET) supports only a long term evolution (LTE) positioning protocol (LPP);
    determining a roaming status of said requesting SUIT enabled terminal (SET) when said requesting SUPL enabled terminal (SET) supports only said LPP;
    routing said SUPL session request to a radio resource location services protocol (RRLP) server based on a SUPL version and said roaming status, when said requesting SUPL enabled terminal (SET) does not support only an LTE positioning protocol (LPP);
    routing said SUPL session request to a roaming LTE positioning protocol (LPP) server when said requesting SUPL enabled terminal (SET) supports only an LTE positioning protocol (LPP), and is not roaming; and
    routing said SUPL session request to a home LTE positioning protocol (LPP) server when said requesting SUPL enabled terminal (SET) supports only an LTE positioning protocol (LPP), and is roaming.

13. The method of intelligently routing a SUPL enabled terminal (SET)-initiated SUPL session request based on SET capabilities according to claim 12, wherein:
    said SUPL session request is a SUPL START message.

14. The method of intelligently routing a SUPL enabled terminal (SET)-initiated SUPL session request based on SET capabilities according to claim 12, wherein:

said SUPL session request is a SUPL TRIGGERED START message.

15. The method of intelligently routing a SUPL enabled terminal (SET)-initiated SUPL session request based on SET capabilities according to claim 12, further comprising:
routing said SUPL session request based on a SUPL version and a roaming status identified for said requesting SUPL enabled terminal (SET).

16. The method of intelligently routing a SUPL enabled terminal (SET)-initiated SUPL session request based on SET capabilities according to claim 12, further comprising:
tracking a number of SET-initiated SUPL session requests routed to an LTE positioning protocol (LPP) server; and
tracking a number of SET-initiated SUPL session requests routed to a radio resource location services protocol (RRLP) server.

17. The method of intelligently routing a SUPL enabled terminal (SET)-initiated SUPL session request based on SET capabilities according to claim 12, further comprising:
routing said SET-initiated SUPL session request to an LTE positioning protocol (LPP) server when said requesting SUPL enabled terminal (SET) supports only an LTE positioning protocol (LPP).

18. The method of intelligently routing a SUPL enabled terminal (SET)-initiated SUPL session request based on SET capabilities according to claim 12, further comprising:
routing said SET-initiated SUPL session request to a radio resource location services protocol (RRLP) server when said requesting SUPL enabled terminal (SET) does not support an LTE positioning protocol (LPP).

19. The method of intelligently routing a SUPL enabled terminal (SET)-initiated SUPL session request based on SET capabilities according to claim 12, further comprising:
providing SUPL intelligent off load (SI-OL) based on said SET capabilities.

* * * * *

UNITED STATES PATENT AND TRADEMARK OFFICE
CERTIFICATE OF CORRECTION

PATENT NO. : 9,516,104 B2  
APPLICATION NO. : 14/482996  
DATED : December 6, 2016  
INVENTOR(S) : Ghozati et al.

Page 1 of 1

It is certified that error appears in the above-identified patent and that said Letters Patent is hereby corrected as shown below:

In the Claims

Column 12, Line 45 Claim 12 reads "SUIT" should read --SUPL--

Signed and Sealed this
Seventh Day of March, 2017

Michelle K. Lee
*Director of the United States Patent and Trademark Office*